(12) United States Patent
Inoue et al.

(10) Patent No.: US 6,535,919 B1
(45) Date of Patent: Mar. 18, 2003

(54) VERIFICATION OF IMAGE DATA

(75) Inventors: Hiroshi Inoue, Yokohama (JP); Toshiyuki Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/339,862

(22) Filed: Jun. 25, 1999

(30) Foreign Application Priority Data

Jun. 29, 1998 (JP) .......................................... 10-183034
Oct. 16, 1998 (JP) .......................................... 10-295936
Oct. 16, 1998 (JP) .......................................... 10-295937

(51) Int. Cl.$^7$ ............................................. G06F 15/16
(52) U.S. Cl. ..................... 709/229; 709/225; 709/226; 709/231; 705/51; 705/54; 705/57; 705/59
(58) Field of Search ........................... 709/225, 226, 709/229, 231; 705/51, 54, 57, 59

(56) References Cited

U.S. PATENT DOCUMENTS

| | | | | |
|---|---|---|---|---|
| 5,003,384 A | | 3/1991 | Durden et al. ................. 358/84 |
| 5,282,249 A | | 1/1994 | Cohen et al. ................. 380/23 |
| 5,619,249 A | | 4/1997 | Billock et al. ................. 348/7 |
| 5,619,501 A | | 4/1997 | Tamer et al. ................. 370/392 |
| 5,629,980 A | * | 5/1997 | Stefik et al. ................. 380/4 |
| 5,794,217 A | * | 8/1998 | Allen .......................... 705/27 |
| 5,845,281 A | * | 12/1998 | Benson et al. ................. 707/9 |
| 5,864,620 A | * | 1/1999 | Pettitt .......................... 380/4 |
| 5,872,846 A | * | 2/1999 | Ichikawa ...................... 380/23 |
| 5,937,164 A | * | 8/1999 | Mages et al. ................. 380/4 |
| 5,995,625 A | * | 11/1999 | Sudia et al. ................. 380/25 |
| 6,006,332 A | * | 12/1999 | Rabne et al. ................. 713/201 |
| 6,032,150 A | * | 2/2000 | Nguyen ....................... 707/102 |
| 6,154,844 A | * | 11/2000 | Touboul et al. ............. 713/201 |
| 6,173,406 B1 | * | 1/2001 | Wang et al. ................. 713/201 |
| 6,226,750 B1 | * | 5/2001 | Trieger ....................... 713/201 |
| 6,338,138 B1 | * | 1/2002 | Raduchel et al. ............. 705/65 |
| 6,385,596 B1 | * | 5/2002 | Wiser et al. ................. 705/51 |
| 6,389,541 B1 | * | 5/2002 | Patterson ..................... 713/201 |

FOREIGN PATENT DOCUMENTS

| | | |
|---|---|---|
| EP | 0715246 | 6/1996 |
| EP | 0778513 | 6/1997 |
| WO | 97/14087 | 4/1997 |
| WO | 97/23997 | 7/1997 |

OTHER PUBLICATIONS

International Organization for Standardization, "Managing Intellectual Property Identification and Protection within MPEG–4". ISO/TC 46/SC 9/WG 1 N25, Dec. 8, 1997.
International Organisation for Standardisation, "Information Technology–Generic Coding Of Audio–Visual Objects", ISO/IEC 14496–1, May 18, 1998.

* cited by examiner

*Primary Examiner*—Saleh Najjar
(74) *Attorney, Agent, or Firm*—Fitzpatrick, Cella, Harper & Scinto

(57) ABSTRACT

Image data, such as image data coded in MPEG4 format, is verified by a client receiving an information data stream that is generated by multiplexing a plurality of coded object data and associated intellectual property management data, from a contents distribution server, wherein the intellectual property management data includes source information representing a copyright holder of the object data. Verification request data is transmitted, based on the source information included in the received intellectual property management data, to the copyright holder, via a different communication channel from that used for receiving the information data stream. The client receives, from the copyright holder, verification result data relating to the object data and then, a decoding process of the object data is controlled based on the verification result data.

13 Claims, 14 Drawing Sheets

VERIFICATION OF IMAGE DATA

BACKGROUND OF THE INVENTION

1. Field of the Invention

The present invention relates to a verification apparatus, verification method, verification system, and storage medium, which are suitable when verification is necessary for the purpose of copyright protection associated with individual objects of a moving image to be played back.

2. Description of the Related Art

FIG. 1 is a block diagram showing a conventional digital video data transmission/reception system. As shown in FIG. 1, a digital video data distribution server 10 downloads digital video data recorded in a digital video data storage device 12 such as a hard disk annexed to the distribution server 10 to a digital video data reception client 20 through a network 30 such as the Internet in response to a request from the reception client 20. The distribution server 10 has a conversion section 11 for coding digital video data. Digital video data is coded by the conversion section 11 to decrease the data amount, and distributed to the reception client 20 in accordance with a procedure such as the TCP/IP protocol. The reception client 20 has a conversion section 21 for decoding digital video data. A received digital video signal is played back by the conversion section 21 and displayed, recorded, or edited.

An example of a system which constructs one moving image scene from a plurality of objects, codes and compresses each object by the conversion section 11 of the distribution server 10, transfers the objects to the reception client 20, and decodes and reconstructs the objects in the reception client 20 to play back the moving image scene is an MPEG-4 player.

FIG. 2 is a block diagram of a conventional MPEG-4 player. FIG. 2 is based on "ISO/IEC FCD 14496-1 FIG. 1–1", and this has been described in detail in "ISO/IEC FCD 14496-1". Only a schematic arrangement will be described below.

An MPEG-4 bit stream transmitted through a network or the like or MPEG-4 bit stream read out from a storage medium such as a DVD-RAM is received by "TransMux Layer" in accordance with a procedure corresponding to transmission/read (session establishment) and separated into streams such as scene description information, object data, and object description data, decoded, and played back by a "FlexMux" section. On the basis of the scene description information, a scene is played back or graphically processed.

FIG. 3 is a schematic and simple block diagram of the player shown in FIG. 2. When verification is necessary for the purpose of copyright protection for individual objects, a bit stream containing a plurality of object data including the scene description information may contain "IP Data Set" (copyright information group).

However, even if the transmission bit stream contains "IP Data Set" (copyright information group), and "IP Data" is played back by "Object Descriptors" of the system shown in FIG. 2 or 3, "IP Data" is not processed in image playback processing. For this reason, "IP Protection" (copyright protection) processing is not executed.

In the system shown in FIG. 2 or 3, even when an "IP Data Set" (copyright information group) stream is contained in addition to the transmission bit stream, "IP Data" is not always played back by "Object Descriptors". Even if "IP Data" is played back by "Object Descriptors", "IP Data" is not processed in image playback processing. For this reason, "IP Protection" (copyright protection) processing is not executed.

In this case, an application can receive decoded "IP Data Set" and execute "IP Protection" processing. However, this processing is unique to the application and is not always executed by another player or a player of another type.

In the system shown in FIGS. 2 and 3, an image is played back after verification processing is performed for individual objects. For this reason, when new objects appear one after another in playing back a moving image scene, production must be temporarily stopped to require verification.

When verification is performed without stopping playback, images to be played back are omitted corresponding to the time required for verification.

SUMMARY OF THE INVENTION

The present invention has been made in consideration of the above situation, and has as its object to efficiently execute verification processing, effectively protect a copyright or the like, effectively use copyright works, and solve the problem that a played back image is omitted due to the delay time associated with verification processing.

According to the first aspect of the present invention, there is provided a verification apparatus characterized by comprising reception means for receiving moving image data containing use permission information from an external information processing apparatus, playback means for playing back part of the moving image data received by the receptor means, input means for inputting characters/symbols, comparison means for comparing the use permission information contained in the moving image data received by the reception means with the characters/symbols input by the input means, and transmission means for, when comparison by the comparison means has revealed that the use permission information matches the characters/symbols, transmitting an instruction signal for instructing to play back the moving image data again from first image data played back by the playback means to the external information processing apparatus.

If the verification apparatus, the moving image data is preferably, e.g., compression-coded moving image data.

Preferably, the verification apparatus further comprises, e.g., storage means for storing the characters/symbols in advance, and the comparison means compares the use permission information contained in the moving image data received by the reception means with the characters/symbols stored in the storage means.

In the verification apparatus, the playback means preferably plays back, e.g., time or spatial part of the moving image data.

In the verification apparatus, the transmission means preferably transmits, together with the instruction signal, e.g., a signal representing that the verification apparatus can use the moving image data.

In the verification apparatus, the transmission means preferably normally receives the moving image data using, e.g., an interface used to receive the moving image data in a normal direction and transmits the instruction signal using the interface in a reverse direction to the normal direction.

In the verification apparatus, the transmission means preferably transmits the instruction signal using, e.g., an upstream of an MPEG4 bit stream.

Preferably, the verification apparatus further comprises, e.g., an interface connected to a communication line, and the transmission means transmits the instruction signal through, e.g., the interface and communication line.

According to the second aspect of the present invention, there is provided a verification apparatus characterized by comprising reception means for receiving moving image data constructed by a plurality of object data including object data containing source information and use permission information, separation means for separating the moving image data received by the reception means into the plurality of object data, playback means for playing back, of the object data separated by the separation means, object data which do not contain the use permission information, input means for inputting characters/symbols, comparison means for comparing the use permission information with the characters/symbols input by the input means in association with, of the object data separated by the separation means, the object data containing the use permission information, and transmission means for, when comparison by the comparison means has revealed that the used permission information matches the characters/symbols, transmitting an instruction signal for instructing to play back the moving image data again from first image data played back by the playback means to an external information processing apparatus corresponding to the source information contained in the plurality of object data constructing the moving image data.

In the verification apparatus, the source information is preferably, e.g., URL (Uniform Resource Locator) information.

According to the third aspect of the present invention, there is provided a verification method characterized by comprising the reception step of receiving moving image data containing use permission information from an external information processing method, the playback step of playing back part of the moving image data received in the reception step, the input step of inputting characters/symbols, the comparison step of comparing the use permission information contained in the moving image data received in the reception step with the characters/symbols input in the input step, and the transmission step of, when comparison in the comparison step has revealed that the use permission information matches the characters/symbols, transmitting an instruction signal for instructing to play back the moving image data again from first image data played back in the playback step to the external information processing method.

In the verification method, the moving image data is preferably, e.g., compression-coded moving image data.

Preferably, the verification method further comprises, e.g., the storage step of storing the characters/symbols in advance, and the comparison step comprises comparing, e.g., the use permission information contained in the moving image data received in the reception step with the characters/symbols stored in the storage step.

In the verification method, the playback step preferably comprises playing back, e.g., time or spatial part of the moving image data.

In the verification method, the transmission step preferably comprises transmitting, together with the instruction signal, e.g., a signal representing that the verification method can use the moving image data.

In the verification method, the transmission step preferably comprises normally receiving the moving image data using, e.g., an interface used to receive the moving image data in a normal direction, and transmitting the instruction signal using the interface in a reverse direction to the normal direction.

In the verification method, the transmission step preferably comprises transmitting the instruction signal using, e.g., an upstream of an MPEG4 bit stream.

Preferably, the verification method further comprises using, e.g., an interface connected to a communication line, and the transmission step comprises transmitting the instruction signal through, e.g., the interface and communication line.

According to the fourth aspect of the present invention, there is provided a verification method characterized by comprising the reception step of receiving moving image data constructed by a plurality of object data including object data containing source information and use permission information, the separation step of separating the moving image data received in the reception step into the plurality of object data, the playback step of playing back, of the object data separated in the separation step, object data which do not contain the use permission information, the input step of inputting characters/symbols, the comparison step of comparing the use permission information with the characters/symbols input in the input step in association with, of the object data separated in the separation step, the object data containing the use permission information, and the transmission step of, when comparison in the comparison step has revealed that the use permission information matches the characters/symbols, transmitting an instruction signal for instructing to play back the moving image data again from first image data played back in the playback step to an external information processing method corresponding to the source information contained in the plurality of object data constructed the moving image data.

In the verified method, the source information is preferably, e.g., URL (Uniform Resource Locator) information.

According to the fifth aspect of the present invention, there is provided a verification system having an information processing apparatus and a verification apparatus, which are connected to communicate with each other, characterized in that the verification apparatus comprises reception means for receiving moving image data containing use permission information from the information processing apparatus, playback means for playing back part of the moving image data received by the reception means, input means for inputting characters/symbols, comparison means for comparing the use permission information contained in the moving image data received by the reception means with the characters/symbols input by the input means, and transmission means for, when comparison by the comparison means has revealed that the use permission information matches the characters/symbols, transmitting an instruction signal for instructing to play back the moving image data again from first image data played back by the playback means to the information processing apparatus.

According to the sixth aspect of the present invention, there is provided a verification system having at least one information processing apparatus and a verification apparatus connected to the information processing apparatus to communicate with each other, characterized in that the verification apparatus comprises reception means for receiving moving image data constructed by a plurality of object data including object data containing source information and use permission information from the information processing apparatus, separation means for separating the moving image data received by the reception means into the plurality of object data, playback means for playing back, of the object data separated by the separation means, object data which do not contain the use permission information, input means for inputting characters/symbols, comparison means for comparing the use permission information with the characters/symbols input by the input means in association with, of the object data separated by the separation means, the object data containing the use permission information, and transmission means for, when comparison by the comparison means has revealed that the use permission information matches the characters/symbols, transmitting an instruction signal for instructing to play back the moving image data again from first image data played back by the playback means to the information processing apparatus corresponding to the source information contained in the plurality of object data constructing the moving image data.

According to the seventh aspect of the present invention, there is provided a storage medium which stores a program that can be executed by an apparatus, characterized in that the apparatus for executing the program is caused to operate as an apparatus comprising reception means for receiving moving image data containing use permission information from an external information processing apparatus, playback means for playing back part of the moving image data received by the reception means, input means for inputting characters/symbols, comparison means for comparing the use permission information contained in the moving image data received by the reception means with the characters/symbols input by the input means, and transmission means for, when comparison by the comparison means has revealed that the use permission information matches the characters/symbols, transmitting an instruction signal for instructing to play back the moving image data again from first image data played back by the playback means to the external information processing apparatus.

According to the eighth aspect of the present invention, there is provided a storage medium which stores a program that can be executed by an apparatus, characterized in that the apparatus for executing the program is caused to operate as an apparatus comprising reception means for receiving moving image data constructed by a plurality of object data including object data containing source information and use permission information, separation means for separating the moving image data received by the reception means into the plurality of object data, playback means for playing back, of the object data separated by the separation means, object data which do not contain the use permission information, input means for inputting characters/symbols, comparison means for comparing the use permission information with the characters/symbols input by the input means in association with, of the object data separated by the separation means, the object data containing the use permission information, and transmission means for, when comparison by the comparison means has revealed that the use permission information matches the characters/symbols, transmitting an instruction signal for instructing to play back the moving image data again from first image data played back by the playback means to the external information processing apparatus corresponding to the source information contained in the plurality of object data constructing the moving image data.

According to the ninth aspect of the present invention, there is provided a verification apparatus characterized by comprising separation means for separating image data constructed by a plurality of object data containing source information into the plurality of object data and source information of the plurality of object data, management means for managing the plurality of source information separated by the separation means, transmission means for transmitting a verification signal to an information device on a network, which is specified by arbitrary source information managed by the management means, reception means for receiving a permission signal transmitted from the information device in response to the verification signal transmitted by the transmission means, and control means for enabling use of object data containing the arbitrary source information on the basis of the permission signal received by the reception means.

In the verification apparatus, the source information is preferably, e.g., URL (Uniform Resource Locator) information.

In the verification apparatus, the image data constructed by the plurality of object data is preferably, e.g., compression-coded moving image data.

The verification apparatus preferably further comprises, e.g., selection means for selecting arbitrary source information managed by the management means.

In the verification apparatus, the transmission means preferably normally receives the image data using, e.g., an interface used to receive the image data constructed by the plurality of object data in a normal direction and transmits the verification signal using the interface in a reverse direction to the normal direction.

In the verification apparatus, the transmission means preferably transmits the verification signal using, e.g., an upstream of an MPEG4 bit stream.

Preferably, the verification apparatus further comprises an interface connected to a communication line, the transmission means transmits the verification signal to the information device through the interface and communication line, and the reception means receives the permission signal from the information device through the communication line and interface.

According to the 10th aspect of the present invention, there is provided a verification method characterized by comprising the separation step of separating image data constructed by a plurality of object data containing source information into the plurality of object data and source information of the plurality of object data, the management step of managing the plurality of source information separated in the separation step, the transmission step of transmitting a verification signal to an information device on a network, which is specified by arbitrary source information managed in the management step, the reception step of receiving a permission signal transmitted from the information device in response to the verification signal transmitted in the transmission step, and the control step of enabling use of object data containing the arbitrary source information on the basis of the permission signal received in the reception step.

According to the 11th aspect of the present invention, there is provided a verification system having an information device and a verification apparatus, which are connected to a network, characterized in that the verification apparatus comprises separation means for separating image data constructed by a plurality of object data containing source information into the plurality of object data and source information of the plurality of object data, management means for managing the plurality of source information separated by the separation means, transmission means for transmitting a verification signal to the information device on a network, which is specified by arbitrary source information managed by the management means, reception means for receiving a permission signal transmitted from the information device in response to the verification signal transmitted by the transmission means, and control means for enabling use of object data containing the arbitrary source information on the basis of the permission signal received by the reception means.

According to the 12th aspect of the present invention, there is provided a storage medium which stores a program for controlling verification processing, characterized in that an apparatus for loading and executing the program is caused to operate as an apparatus comprising separation means for separating image data constructed by a plurality of object data containing source information into the plurality of object data and source information of the plurality of object data, management means for managing the plurality of source information separated by the separation means, transmission means for transmitting a verification signal to an information device on a network, which is specified by arbitrary source information managed by the management means, reception means for receiving a permission signal transmitted from the information device in response to the verification signal transmitted by the transmission means, and control means for enabling use of object data containing the arbitrary source information on the basis of the permission signal received by the reception means.

According to the 13th aspect of the present invention, there is provided a verification apparatus characterized by comprising coding means for coding streams of object data constructing image data and streams of source information of the object data into one stream, generation means for generating a decoded stream from the plurality of streams coded by the coding means, separation means for separating the decoded stream generated by the generation means into the streams of the plurality of object data contained in the decoded stream and the streams of the source information of the plurality of object data, management means for managing the source information of the object data, and transmission means for transmitting the plurality of streams of source information separated by the separation means to the management means.

In the verification apparatus, the source information is preferably URL (Uniform Resource Locator) information.

In the verification apparatus, the image data constructed by the plurality of object data is preferably compressed-coded moving image data.

Preferably, the verification apparatus further comprises, e.g., designation means for designating a type of each stream coded by the coding means, and also identification means for identifying the type of each stream separated by the separation means, and sending means for sending each stream to an appropriate decoder on the basis of the type identified by the identification means.

According to the 14th aspect of the present invention, there is provided a verification method characterized by comprising the coding step of coding streams of object data constructing image data and streams of source information of the object data into one stream, the generation step of generating a decoded stream from the plurality of streams coded in the coding step, the separation step of separating the decoded stream generated in the generation step into the streams of the plurality of object data contained in the decoded stream and the streams of the source information of the plurality of object data, the management step of managing the source information of the object data, and the transmission step of transmitting the plurality of streams of source information separated in the separation step to the management step.

In the verification method, the source information is preferably URL (Uniform Resource Locator) information.

In the verification apparatus, the image data constructed by the plurality of object data is preferably compression-coded moving image data.

The verification method preferably further comprises, e.g., the designation step of designating a type of each stream coded in the coding step, and also the identification step of identifying the type of each stream separated in the separation step, and the sending step of sending each stream to an appropriate decoder on the basis of the type identified in the identification step.

According to the 15th aspect of the present invention, there is provided a verification system comprising a transmission apparatus and a reception apparatus, characterized in that the transmission apparatus comprises coding means for coding streams of object data constructing image data and streams of source information of the object data into one stream, generation means for generating a decoded stream from the plurality of streams coded by the coding means, and transmission means for transmitting the decoded stream generated by the generation means to the reception apparatus, and the reception apparatus comprises separation means for separating the decoded stream transmitted from the transmission apparatus into the streams of the plurality of object data contained in the decoded stream and the streams of the source information of the plurality of object data, management means for managing the source information of the object data, and sending means for sending the plurality of streams of source information separated by the separation means to the management means.

According to the 16th aspect of the present invention, there is provided a storage medium which stores a program that can be executed by an apparatus, characterized in that the apparatus for executing the program is caused to operate as an apparatus comprising coding means for coding streams of object data constructing image data and streams of source information of the object data into one stream, generation means for generating a decoded stream from the plurality of streams coded by the coding means, separation means for separating the decoded stream generated by the generation means into the streams of the plurality of object data contained in the decoded stream and the streams of the source information of the plurality of object data, management means for managing the source information of the object data, and transmission means for transmitting the plurality of streams of source information separated by the separation means to the management means.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described below with reference to the accompanying drawings. The following embodiments are related to a system for efficiently executing verification processing using a so-called "back-channel".

(First Embodiment)

Figure 3:
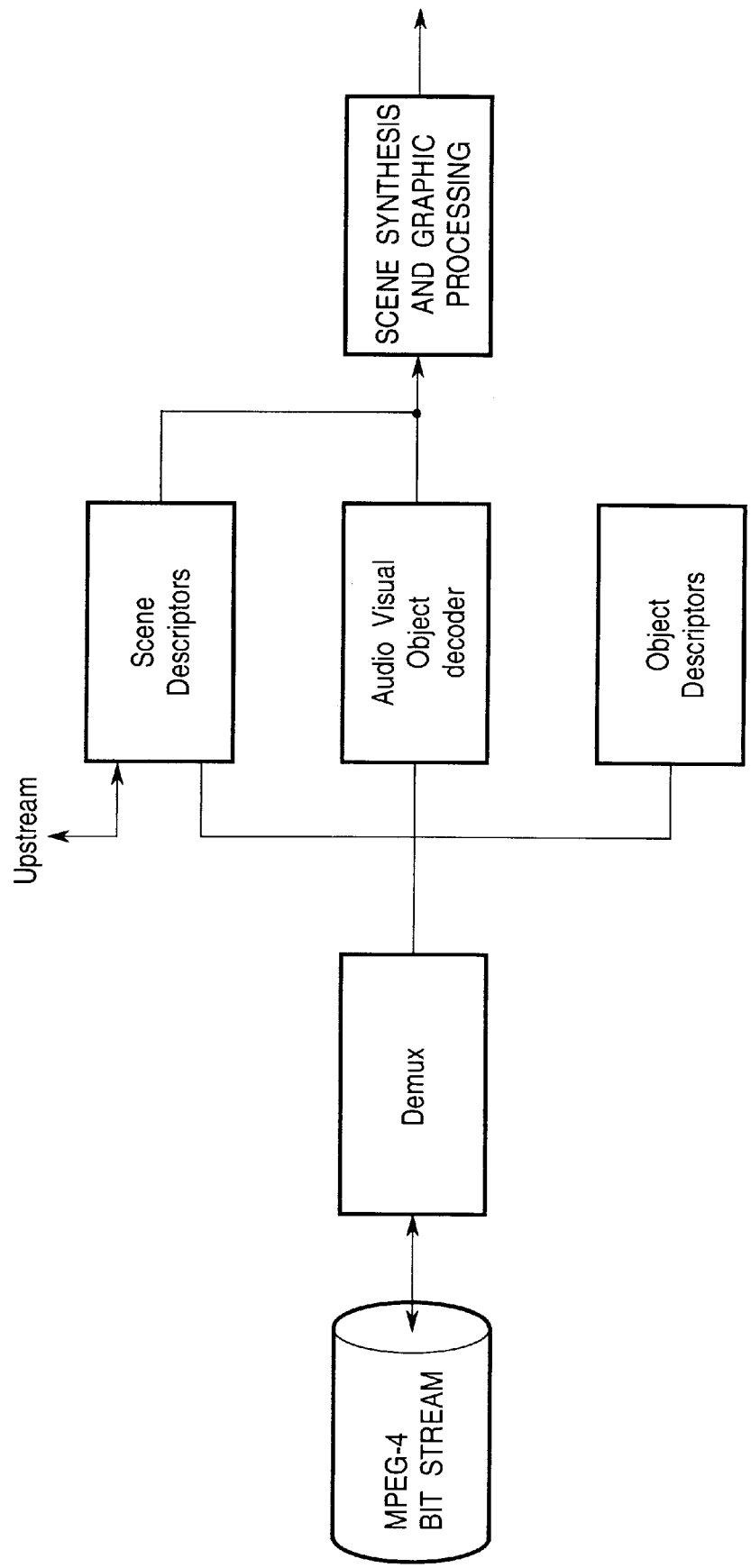
FIG. 3 is a block diagram showing the schematic and simple arrangement of the player shown in FIG. 2.
Figure 4:
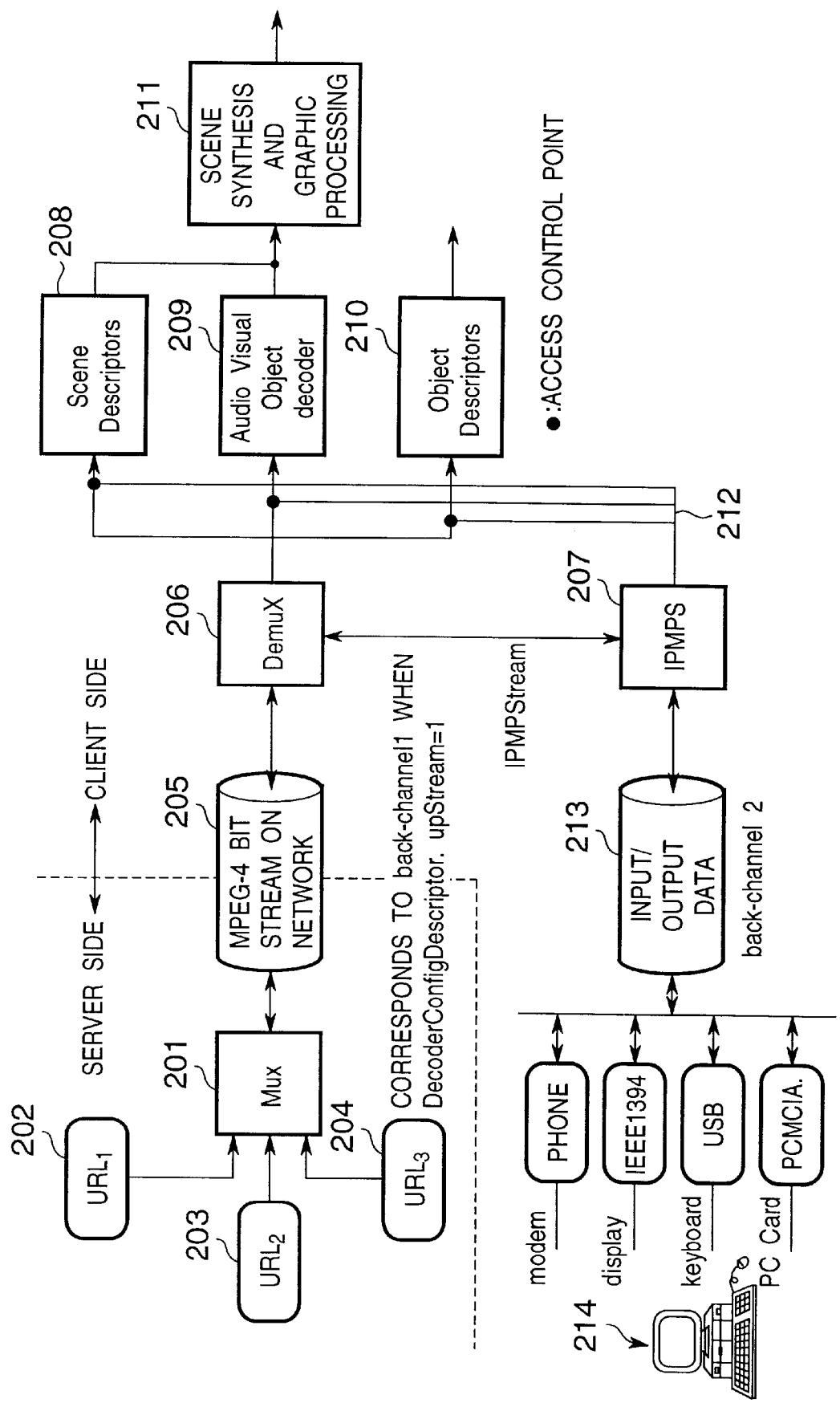
FIG. 4 is a block diagram showing the arrangement of an MPEG-4 player according to a preferred embodiment of the present invention.

FIG. 4 is a block diagram showing the schematic arrangement of a system including an MPEG-4 player according to a preferred embodiment of the present invention. The system shown in FIG. 4 operates "IP Data" to realize "IP Protection". The system shown in FIG. 4 has an IPMPS (Intellectual Property Management and Protection System) 207 and is different from the system shown in FIG. 3 in that the copyright verification and protection function are realized by this IPMPS 207.

Figure 7:
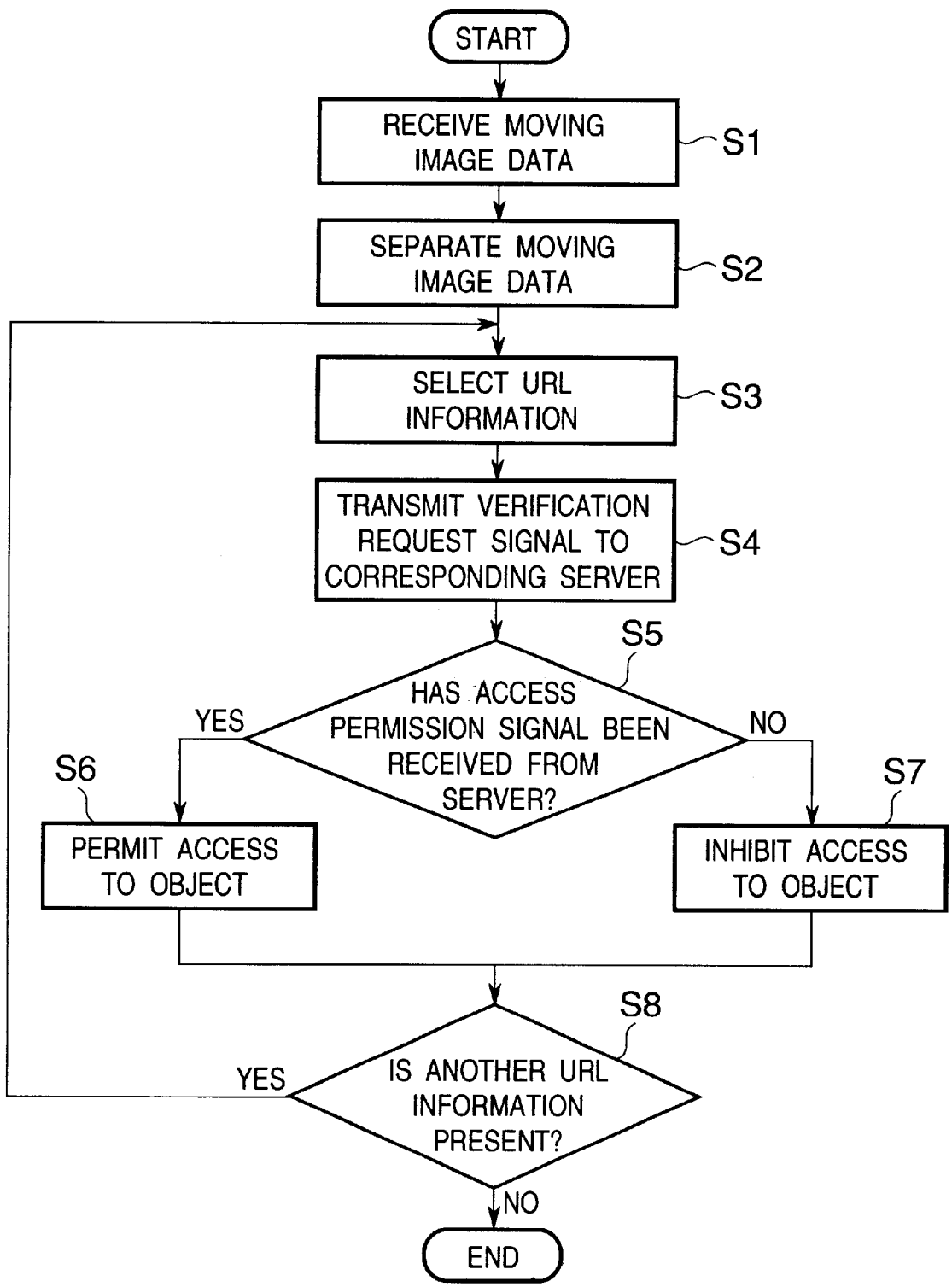
FIG. 7 is a flow chart showing client operation associated with verification processing.

FIG. 7 is a flow chart showing client operation associated with verification processing. Operation of the system shown in FIG. 4 will be described below with reference to FIG. 7. On the server side, a multiplexer 201 receive individual objects from a plurality of network sites 202 to 204 having different URLs (Uniform Resource Locators) such as URL1, URL2, and URL3, and generates moving image data constructed by the plurality of objects. This moving image data is transmitted to a client through the network in response to a request from the client as an MPEG-4 bit stream 205.

In step S1, the client receives the MPEG-4 bit stream 205 from the server. Each object constructing the MPEG-4 bit stream has information (URL information) representing the copyright holder. In step S2, the client separates the received MPEG-4 bit stream into a plurality of streams such as the plurality of objects and accompanying information (including URL information) by a demultiplexer 206. The URL information of each object is sent to the IPMPS 207 as part of "IPMP Stream" as a stream of "IP Data".

In step S3, one URL information is selected from one or a plurality of pieces of URL information sent to the IPMPS 207. To do this, the operator may designate the information, or the IPMPS 207 may select the information in accordance with a predetermined order.

In step S4, a verification request signal is transmitted to the server 201 with a corresponding URL in one or a plurality of servers connected to the network on the basis of the selected URL information. In this case, a back-channel 1 or back-channel 2 to be described later is used for transmission.

In step S5, the client waits for an access permission signal transmitted from the server 201 that has received the verification request signal. When the access permission signal is received, the flow advances to step S6. When no access permission signal is received in a predetermined time, the flow advances to step S7.

In step S6, when the access permission signal is received, an object for which access permission (verification) has been obtained can be accessed. More specifically, by enabling a control signal 212 for controlling an access control point, a corresponding stream (i.e., the stream of an object for which access is permitted by the access permission signal) from the demultiplexer 206 can be accessed by a scene descriptor 208, audio visual decoder 209, and object descriptor 210.

In step S7, by disabling the control signal 212 for controlling an access control point, access to a corresponding stream (i.e., the stream of an object for which access permission has not been obtained regardless of the verification request) from the demultiplexer 206 by the scene descriptor 208, audio visual decoder 209, and object descriptor 210 is inhibited.

In step S8, it is confirmed whether URL information added to another object is present. If YES in step S7, the flow returns to step S3; otherwise, the series of processing operations is ended.

A scene/graphic processing section 211 performs scene synthesis and graphic processing on the basis of data supplied from the scene descriptor 208, audio visual decoder 209, and object descriptor 210. Only objects for which access permission has been obtained may be synthesized for playback. Alternatively, when an object for which access permission has not been obtained is present, playback may not be performed at all.

The above-described verification processing will be described below in more detail.

An MPEG-4 stream contains "ES_Descriptor" that describes the contents of "Elementary Stream" (ES) as a bit stream in units of objects and "OD_Descriptor" that describes the object itself. When URL information for designating a command and an access destination for remote access is obtained in "ES_Descriptor" or "OD_Descriptor", remote access is executed in accordance with a procedure shown in FIG. 5.

Figure 5:
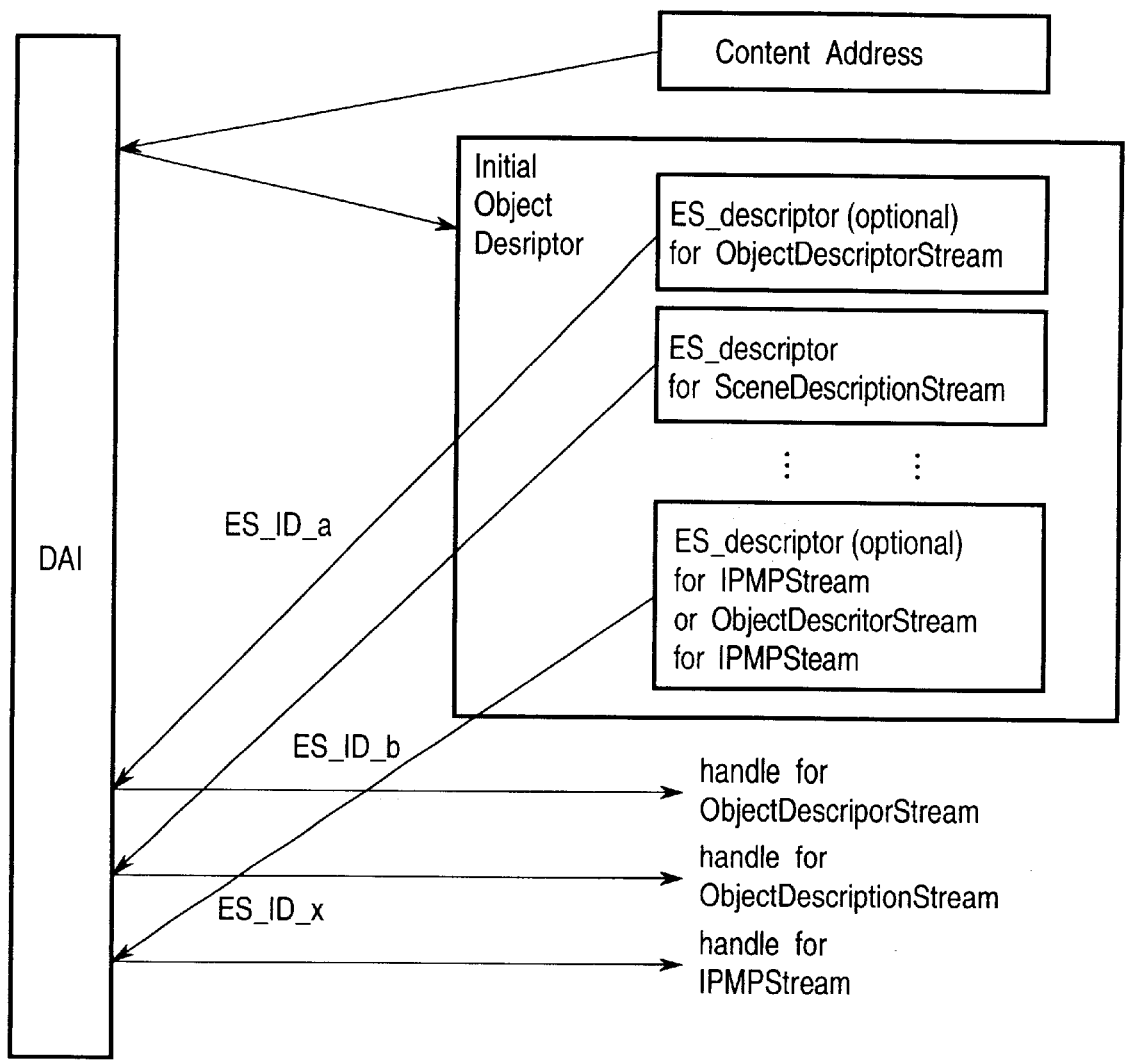
FIG. 5 is simple block diagram for explaining remote access.

FIG. 5 is a schematic block diagram for explaining remote access. Referring to FIG. 5, "DAI" is an interface layer between an MPEG-4 bit stream and network, which is called "DMIF Application Interface". Details have been described in the "ISO/IEC 14496-6 DMIF document DMIF Application Interface" and will be omitted herein.

The MPEG-4 bit stream also contains "DecoderConfigDescriptor" representing information of a decoder type corresponding to "Elementary Stream" (ES). This "DecoderConfigDescriptor" is a structure formed from some data elements. One of the elements is a 1-bit upStream parameter representing the stream type. Details have been described in the "ISO/IEC 14496-1 FCD 8. 3. 4. DecoderConfigDescriptor" and will be omitted herein.

---

Expression 1 is an example of "DecoderConfigDescriptor".
[Expression 1: DecoderConfigDescriptor]
aligned(8) class DecoderConfigDescriptor
    : bit(8) tag=DecoderConfigDescrTag {
  bit(8) length;
  bit(8) objectProfileIndication;

```
        bit(6) streamType;
        bit(1) upStream;
        const bit(1) reserved=1;
        bit(24) bufferSizeDB;
        bit(32) maxBitrate;
        bit(32) avgBitrate;
        DecoderSpecificInfo decSpecificInfo[ ];
}
```

The stream is identified on the basis of the value of "streamType" as a data element in the class declaration of "DecoderConfigDescriptor" of expression 1. The value of "streamType" is defined as in Table 1.

TABLE 1

Stream Type Designation Value

| Stream Type Designation Value | Stream Type |
|---|---|
| 0x00 | reserved for ISO use |
| 0x01 | ObjectDescriptorStream |
| 0x02 | ClockReferenceStream |
| 0x03 | SceneDescriptionStream |
| 0x04 | VisualStream |
| 0x05 | AudioStream |
| 0x06 | MPEG7Stream |
| 0x07–0x09 | reserved for ISO use |
| 0x0A | ObjectContentInfoStream |
| 0x0B | IPMPStream |
| 0x0C–0x1F | reserved for ISO use |
| 0x20–0x3F | user private |

In Table 1, a value for identifying "IPMP Stream" unique to this embodiment is added to the "ISO/IEC 14496-1 FCD Table 0-1: streamType Values". Parameters or terms in Table 1 are the same as in the "ISO/IEC 14496-1 FCD", and a detailed description thereof will be omitted.

As described above, in Table 1, the value for identifying "IPMP Stream" unique to this embodiment is added. This "IPMP Stream" is originally contained in a source code for the multiplexer 201 for generating the MPEG-4 bit stream.

In this source code for the multiplexer 201, "IPMP Stream" is defined by expression 2 (*) below.

```
[Expression 2: Mux source]
{
    objectDescriptorID 0
    es_descriptor [
        {
            es_Number 1
            fileName Inline.od
            streamType BIFS
            streamPriority 5
            decConfigDescr {
                streamType 2//OD Stream
                bufferSizeDB 200
            }
            alConfigDescr {
                useAccessUnitStartFlag TRUE
                useAccessUnitEndFlag TRUE
                useRandomAccessPointFlag TRUE
                useTimeStampsFlag TRUE
                timeStampResolution 1000
                timeStampLength 14
            }
        }
        {
            es_Number 2
            streamType BIFS
            streamPriority 5
            fileName Inline.bif
            decConfigDescr {
                streamType 4//BIFS Stream
                bufferSizeDB 1000
            }
            alConfigDescr {
                useAccessUnitStartFlag TRUE
                useAccessUnitEndFlag TRUE
                useRandomAccessPointFlag TRUE
                useTimeStampsFlag TRUE
                timeStampResolution 100
                timeStampLength 14
                OCR_ES_Id 1
            }
        }
    ]
}
{
    objectDescriptorID 33
    es_descriptor [
        {
            es_Number 1
            fileName t2
            streamType G723
            streamPriority 4
            decConfigDescr {
                streamType 6//AudioStream
                profileAndLevelIndication0xc1//G723
                bufferSizeDB 300
            }
            alConfigDescr {
                timeStampResolution 1000
                compositionUnitRate 30
            }
            extensionDescriptor IPMP_DescriptorPointer {
                IPMP_Descriptor_ID 69
            }
        }
        {
            es_Number 2
            fileName t1
            streamType H263
            decConfigDescr {
                streamType 8//IPMPStream (*)
                bufferSizeDB 1600
            }
            alConfigDescr {
                useAccessUnitStartFlag TRUE
                useAccessUnitEndFlag TRUE
                useRandomAccessPointFlag TRUE
                useTimeStampsFlag TRUE
                timeStampResolution 1000
                timeStampLength 10
                PDU_seqNumLength 3
                AU_seqNumLength 8
                OCR_ES_Id 2113
            }
        }
    ]
}
{
    objectDescriptorID 32
    es_descriptor {
        es_Number 1
        fileName t1
        streamType H263
        decConfigDescr {
            streamType 5//VisualStream
            profileAndLevelIndication0xC2//H263
            bufferSizeDB 1600
        }
        alConfigDescr {
            useAccessUnitStartFlag TRUE
            useAccessUnitEndFlag TRUE
            useRandomAccessPointFlag TRUE
```

-continued

```
            useTimeStampsFlag TRUE
            timeStampResolution 1000
            timeStampLength 10
            PDU_seqNumLength 3
            AU_seqNumLength 8
            OCR_ES_Id 2113
        }
    }
}
```

In expression 2, when "objectDescriptorID" is "33", "IPMP Stream" is defined. This means that a portion representing the stream of an object protected by "IPMP Stream" is contained in "objectDescriptorID 33".

The stream type of "IPMP Stream" is defined as "streamType8". This meaning is the same as that of "0x0b" defined as the stream type designation value of "IPMP Stream" in Table 1.

In this embodiment, the multiplexer 201 collects such source codes and adds "IPMP Stream" to the stream of a plurality of objects, thereby generating an MPEG-4 bit stream coded into one stream.

When the stream is identified by the above-described "DecoderConfigDescriptor", not only "IPMP Stream" but also the streams of objects can be separated from one stream.

As shown in FIG. 4, when "DecoderConfigDescriptor. upStream" as a flag representing the direction of a stream is set at "1", the system is set in the "upstream" state to transmit a stream from the client side to the server side. In this case, a transmission function using the state of the "upstream" state will be referred to as "back-channel 1".

In normal playback, "DecoderConfigDescriptor. upStream" is at "0", so a "downstream" state in which a stream is transmitted from the server side to the client side is set. When permission for access to an object is wanted, "DecoderConfigDescriptor. upStream" is set at "1", and so-called "back-channel 1" for "upstreaming" necessary data to the URL destination is used to send "IPMP Management Data" (copyright management information) to the server side as "IPMP Stream", so response data is transmitted from the URL destination by remote access.

"IPMP Stream" shown in Table 1 has "IPMP_ES" and "IPMP_D". Each "IPMP_ES" is formed from a series of "IPMP_Messages". Expression 3 is an example of description of "IPMP_Messages".

[Expression 3: IPMP_Message]
```
class IPMP_Message ( ) {
    unsigned int (8) IPMPS_TypeCount;
    bit (1) hasURL;
    int i;
    for (i = 0; i < IPMPS_TypeCount; i++) {
        unsigned int (16) IPMP_Type[[i]];
        unsigned int (32) offset[[i]];
        unsigned int (16) length[[i]];
    }
    if (hasURL) {
        unsigned int (5) lengthOfURLbits;
        bit (3) reserved=0b111;
        unsigned int (lengthOfURLbits) lengthOfURL;
        char (8) URLString[lengthOfURL];
    }
    for (i = 0; i < IPMPS_TypeCount; i++) {
        char (8) IPMP_data[length[i]];
    }
}
```

In expression 3, "IPMPS_TypeCount" represents the number of different "IPMP types". Since different IPMPSs can exist, "IPMP_Messages" can correspond to a plurality of IPMPSs.

When a URL is designated, "IPMPS_TypeCount" has a value "0". Otherwise, "IPMPS_TypeCount" has "1" as a minimum value. In this case, "IPMP_Message" stored in an external device is referred to and used in place of internal "IPMP_Message".

"IPMPS_D" is formed from "IPMP Descriptor". This "IPMP Descriptor" is a data structure for performing specific IPMP control for each "elementary streams". "IPMP Descriptor Updates" is executed as part of an object descriptor stream. Expression 4 is an example of description of "IPMP Descriptor Updates".

[Expression 4: IPMP_DescriptorUpdate]
```
aligned (8) class IPMP_DescriptorUpdate: Unit (8)
IPMP_DescriptorUpdateTag {
    unsigned int (8) descriptorCount;
    int i;
    for (i = 0; i < descriptorCount; i++) {
        IPMP_Descriptor d[[i]];
    }
}
```

In expression 4, "descriptorCount" represents the number of "IPMP_Descriptors" to be updated, and d[i] represents a certain "IPMP_Descriptor".

Expression 5 is an example of description of "IPMP_Descriptor".

[Expression 5: IPMP_Descriptor]
```
class IPMP_Descriptor ( ) {
    bit (8) IPMP_Descriptor_ID;
    unsigned int (8) IPMPS_TypeCount;
    bit (1) hasURL;
    int i;
    for (i = 0; i < IPMPS_TypeCount; i++) {
        unsigned int (16) IPMPS_Type[[i]];
        unsigned int (32) offset[[i]];
        unsigned int (16) length[[i]];
    }
    if (hasURL) {
        unsigned int (5) lengthOfURLbits;
        bit (3) reserved=0b111;
        unsigned int (lengthOfURLbits) lengthOfURL;
        char (8) URLString[lengthOfURL];
    }
    for (i = 0; i < IPMPS_TypeCount; i++) {
        char (8) IPMP_data[length[i]];
    }
}
```

In expression 5, "IPMP_Descriptor_ID" is a number unique to each "IPMP_Descriptor". "ES_Descriptors" refer to "IPMP_Descriptors" using the "IPMP_Descriptor_ID". "IPMPS_TypeCount" represents the number of different IPMPSs designated by "IPMP_message".

Figure 6:
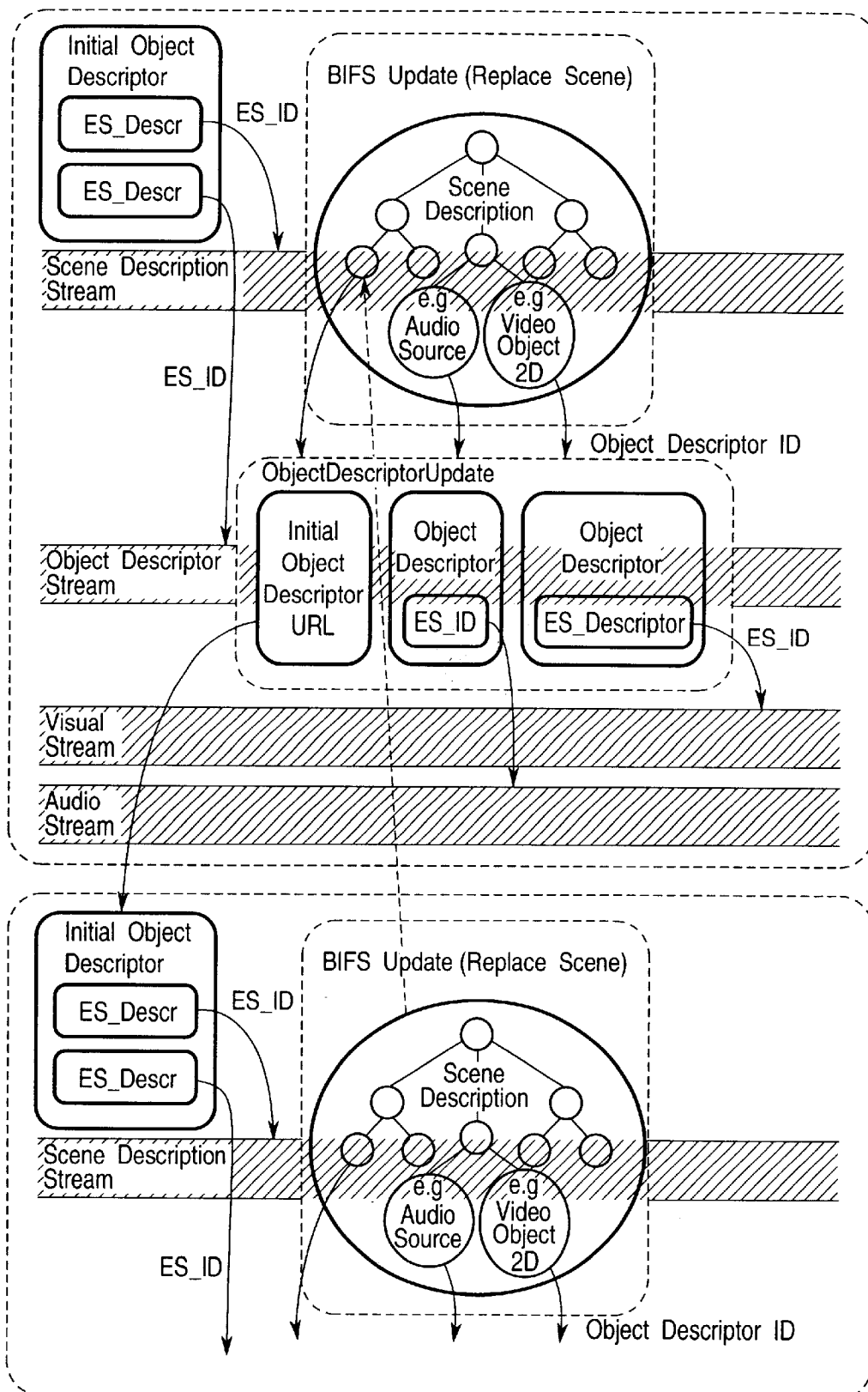
FIG. 6 is a view showing an example of a hierarchical structure when a URL destination further has a URL designation.

FIG. 6 is a view showing an example of a hierarchical structure when a URL destination further has a URL designation. FIG. 6 shows a two-layer structure. If still another URL designation is present, a three- or four-layer structure may be formed. Referring to FIG. 6, although "IPMPStream" is not clearly illustrated, "IPMP ES" or "IPMP D" associated with an object to be remote-designated is decoded and remote-accessed in correspondence with "SceneDescriptionStream" or "ObjectDescriptionStream", as needed, as in the above-described FIG. 5.

Verification processing using the "upstream" state of the MPEG-4 bit stream, i.e., using the back-channel 1 has been described above. This verification processing using the "back-channel 1" is "upstream" processing in real-time bit stream playback and therefore assumes high-speed processing with a relatively small data amount and short processing time. In a real-type playback system, delay due to remote access and verification using the "back-channel 1" is preferably as small as possible.

However, even when the data amount is small, verification may require a considerable time. This poses a problem of delay in the "back-channel 1". From the viewpoint of the allowable delay time and necessity of interactive operability, a second "back-channel" is preferably prepared.

For this purpose, in this embodiment, an I/O (interdevice Input/Output) interface different from that for transmitting the MPEG-4 bit stream is used. This will be called a "back-channel 2".

Before a description of verification processing using the "back-channel 2", the relationship between the data amount and delay time in the "back-channel 1" and "back-channel 2" will be considered. In the report of "MPEG-4 Requirement Group", the allowable delay time of "back-channel 1" that does not impede real-time playback is 1 frame time. On the basis of this, the relationships between the assumed data amount and bit rate in the "back-channel 1" and "back-channel 2" are shown in Table 2.

TABLE 2

Delay Times and Data Amounts of back-channels 1 and 2

| Notation | Use Purpose | Data Amount | Delay Time |
|---|---|---|---|
| back-channel 1 | high-speed IPMP remote access for verification | 3000–5000 bits/s | 100–300 ms |
| back-channel 2 | low-speed IPMP input/output access for verification | — | >500 ms |

In high-speed IPMP remote access for verification, the delay time is limited in processing a data amount within 100 to 500 bits/frame through a transmission line with a bit rate of 3K to 5K/sec. The relationship between "IPMP_Message" data or "IPMP_Description" data and delay-bandwidth as a result of "remote content access" by "back-channel" can be regarded as Table 2, so the data amount for actual verification is limited. Verification often requires time asynchronously with stream processing.

Verification of a plurality of objects may be executed not in one site but in a plurality of sites. In this case, the conditions in Table 2 become stricter and are not suitable for practical use. Hence, for a verification procedure which allows low-speed processing asynchronously with stream processing, the "back-channel 2" is preferably used.

Processing using the "back-channel 2" will be described below. The "back-channel 2" for low-speed IPMP input/output access for verification is used as an I/O (interdevice Input/Output) interface different from that for transmitting the MPEG-4 bit stream, as shown in FIG. 4.

A computer terminal 214 having a keyboard, display, and modem is prepared next to the "back-channel 2" and connected to the telephone line and IPMPS 207. In this arrangement, the computer terminal 214 receives an object in a stream, which requires verification, and information of the verification destination from the IPMPS 207 and displays the information on the display. The operator selects an object in the stream, which requires verification, by referring to the display. The computer terminal 214 calls the verification destination, receives the verification method or access code from the verification destination, and displays the contents on the display. When the operator inputs the received information using the keyboard, the IPMPS 207 is notified of the input information and enables access to the necessary object.

Use of a telephone line has been exemplified above. Instead, a cable of CATV or radio communication channel may be used.

Alternatively, a PC card storing information necessary for access verification, which has been acquired by a contract with the verification destination in advance, is inserted into the PCMCIA interface in the computer terminal 214 to notify the IPMPS 207 of information necessary for verification and enable access to the object, as needed.

For verification processing for which the operation time or verification time becomes relatively long, this method is effective for processing other than real-time processing, e.g., at the time of starting stream playback or scene change.

As described above, according to the first embodiment, the "back-channel 1" or "back-channel 2" can be selected and used in accordance with the application purpose. This selection may be performed by the operator, or the optimum back-channel may be selected in the system in consideration of the delay time limit or the like.

When two different "back-channels" are prepared, flexible verification processing can be realized.

(Second Embodiment)

As described above, in the first embodiment, an IPMP Stream containing URL information is added to the streams of a plurality of objects, and these streams are coded into one stream to generate an MPEG-4 bit stream. In addition, a stream containing IPMP Stream is identified from this MPEG bit stream, and a "back-channel" is used when the MPEG-4 player transmits the verification request signal to a server having a corresponding URL in one or a plurality of servers connected on the network. In the second embodiment, another method of using the "back-channel" will be described.

Figure 2:
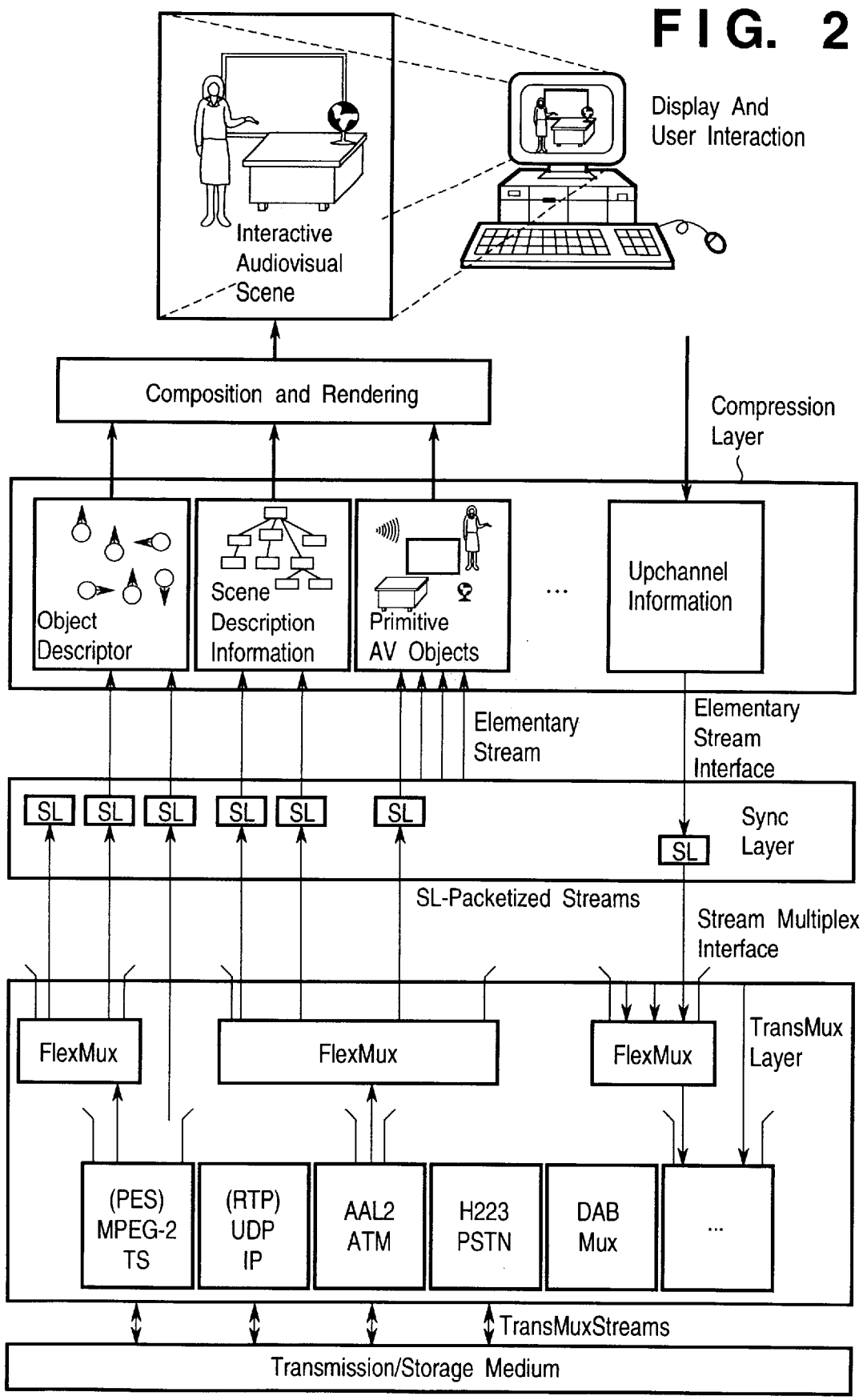
FIG. 2 is a block diagram showing the arrangement of a conventional MPEG-4 player.
Figure 8:
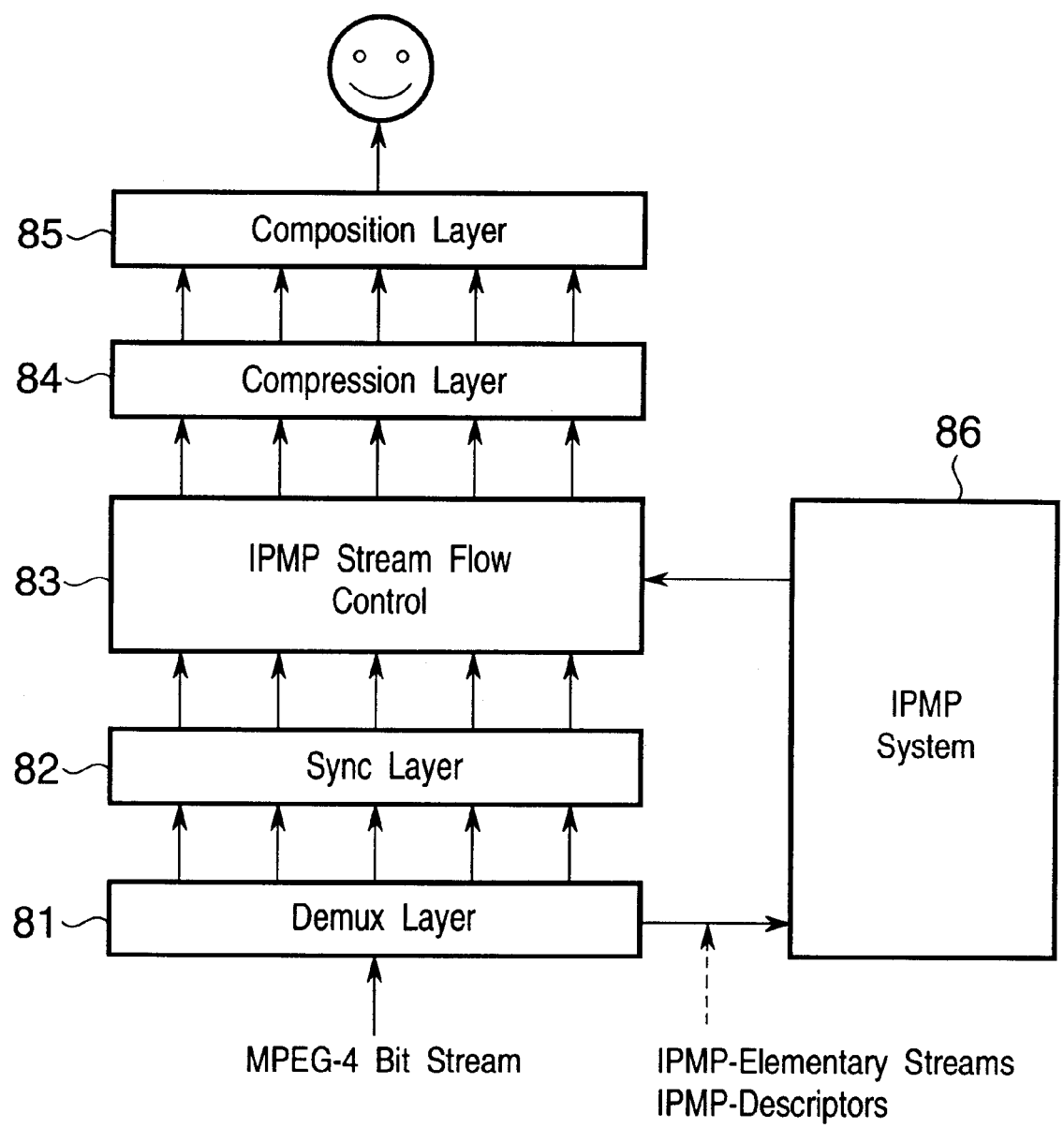
FIG. 8 is a block diagram showing the arrangement shown in FIG. 3, to which an IPMP System processing section is further added.

FIG. 8 is a block diagram showing the schematic arrangement of an MPEG-4 player having the arrangement shown in FIGS. 2 and 3, to which a copyright protection system (IPMP System 86) and object data processing flow control section (IPMP Stream Flow Control 83) are added.

FIG. 8 shows the contents of stream control at the "access control point" in FIG. 4 in more detail.

Referring to FIG. 8, an MPEG-4 bit stream containing coded image object data requiring copyright protection is divided into object data by a Demux Layer 81 and converted/synchronized to the time in the player by a Sync Layer 82 in accordance with time stamp information added in coding or bit stream generation.

On the other hand, the IPMP System 86 performs verification processing for object data requiring copyright protection, which are separated into individual data, on the basis of copyright protection information separated by the Demux Layer 81 and transmits a permission signal to the IPMP Stream Flow Control 83 to perform object data processing flow control. In a Compression Layer 84, each object data is decoded by a decoder in units of object data. In a Composition Layer 85, a scene is synthesized in accordance with the decoded scene description, and displayed.

Especially, there are some object data processing flow control methods. In this embodiment, the problem to be solved will be described by exemplifying Test Conditions #1 and #2.

Table 3 shows four test plans as examples of the relationship between the IPMP System (IPMPS) and Stream Flow Control.

TABLE 3

IPMP Test Plan

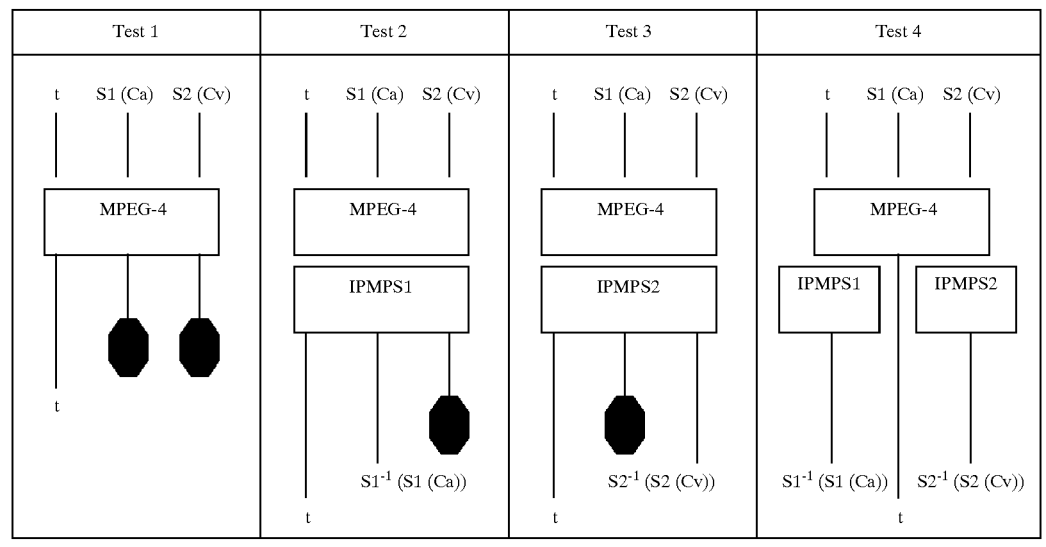

In Table 3, test 1 shows a case wherein no IPMP systems are present; test 2, a case wherein only the IMPMPS1 is present; test 3, a case wherein only IPMPS2 is present; and test 4, a case wherein both the IPMPS1 and IPMPS2 are present.

Input/output signals in the respective tests and the different in role between the IPMPS1 and IPMPS2 will be described next.

In Table 3, Unprotected Text Object Stream is expressed by "t", Protected Audio Stream is expressed by "S1(Ca)", and Protected Video Stream is expressed by "S2(Cv)".

S1(Ca) IPMP System is expressed by "IPMPS1", and the XOR result (logical exclusive OR) between original coded data and ASCII code "x" is expressed by "S1(Ca)". hence, the interpretation key is ASCII code "x", and the output is the "XOR" between the original coded data and "x".

S2(Cv) IPMP System is expressed is expressed by "IPMPS2", and the XOR result between original coded data and ASCII code "a" is expressed by "S2(Cv)". hence, the interpretation key is ASCII code "a", and the output is the "XOR" between the original coded data and "a".

"Graceful Error" means an error on the output side of the decoder, which occurs when the protected object stream cannot be normally interpreted by the key. "Graceful Error" that may occur in, e.g., a Protected Video Stream is error such as "no display" or "display of distorted image". In only test 4, no "Gradeful Error" occurs.

Table 4 shows the conditions and parameters of IPMP Verification test.

TABLE 4

IPMP Verification Test Condition and Parameters

| | Condition | Test 1 | Test 2 | Test 3 | Test 4 |
|---|---|---|---|---|---|
| Contents | α | Unprotected Text | ← | ← | ← |
| | S1 (Ca) | Protected Audio | ← | ← | ← |
| | S2 (Cv) | Protected Video | ← | ← | ← |
| IPMP Condition | IPMP-ES and IPMP-D | yes | yes | yes | yes |
| | IP Identification Data Set | yes | yes | yes | yes |
| | IPMP-S1 | none | XOR "x" for S1 (Ca) | none | XOR "x" for S1 (Ca) |
| | IPMP-S2 | none | none | XOR "a" for S2 (Cv) | XOR "a" for S2 (Cv) |
| Test Condition | #1 | none | Embedded "key" & constant delay | ← | ← |

TABLE 4-continued

IPMP Verification Test Condition and Parameters

| Condition | Test 1 | Test 2 | Test 3 | Test 4 |
| --- | --- | --- | --- | --- |
| #2 | none | User interaction & non-fixed delay | ← | ← |
| Synchronization | yes | yes | yes | yes |
| Expected result | α; pass<br>S1 (Ca); error<br>S2 (Cv); error | α; pass<br>S1 (Ca); pass<br>S2 (Cv); error | α; pass<br>S1 (Ca); error<br>S2 (Cv); pass | α; pass<br>S1 (Ca); pass<br>S2 (Cv); pass |

In Table 4, when test 2 is to be executed, under Test Condition #1, a normal key for each object stream is present in the IPMP system (IPMPS1 and IPMPS2) in advance so that an incoming object stream is immediately (or with a predetermined delay time) "interpreted" and output to each decoder.

When test 2 is to be executed, under Test Condition #2, a normal key for each object stream is not present in the IPMP system (IPMPS1 and IPMPS2) in advance. The normal key is input from external keys or by a user interactive method such as smart card insertion, and an incoming object stream is "interpreted" and output to each decoder. For this reason, the delay time is not constant.

Figure 9:
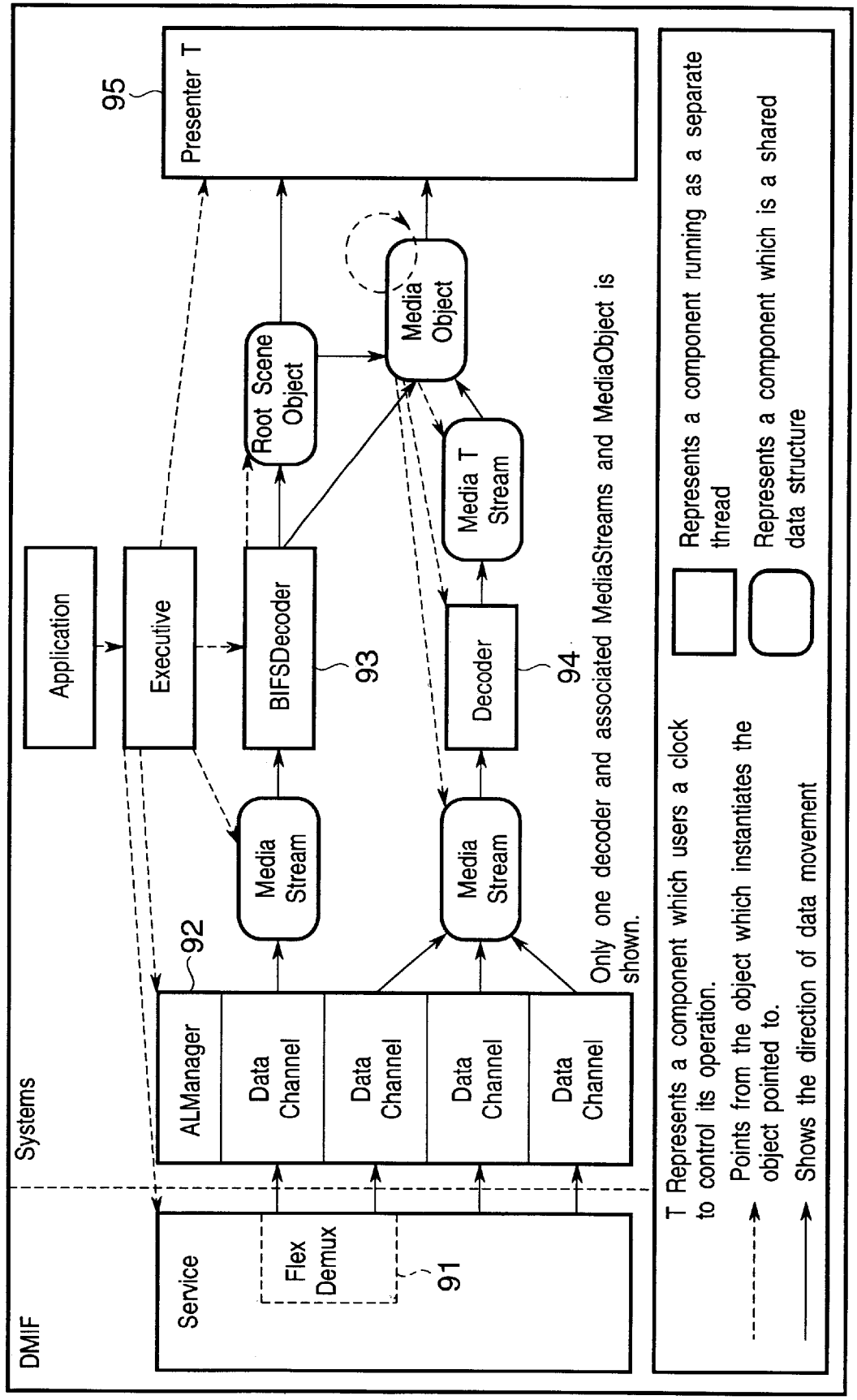
FIG. 9 is a view showing the internal functional block diagram and data flow of an MPEG-4 player.

FIG. 9 shows the internal functional block diagram and data flow of an MPEG-4 player.

FIG. 9 shows a simple arrangement of an actual system for a description of a synchronization mechanism, and the IPMP system and object data processing flow are not illustrated.

First, an entry function Execute() of the MPEG-4 System Player started for an application starts functional modules, ensures a data area buffer, allocates the memory to each functional function, and prepares for data processing.

MPEG-4 bit streams input by a FlexDemux 91 as a Service module function of the DMIF layer, i.e., packet data or data files from the network are received as a series of data groups and transferred to an ALManager 92.

In the ALManager 92, object data such as video data, audio data, and scene description information are separated from the data group. The scene description information or object-associated information data are transferred to a BIFS Decoder 93, and video and audio data are transferred to a Decoder 94 as data channels.

In accordance with the scene description information decoded by the BIFS Decoder 93 and Decoder 94 and time stamp information added in bit stream generation, a Presenter 95 or Media Stream data processing section (not shown) adjusts the time relationship between the decoder Media Object data (Video and Audio data), synchronizes them, and synthesizes a scene.

Figure 10:
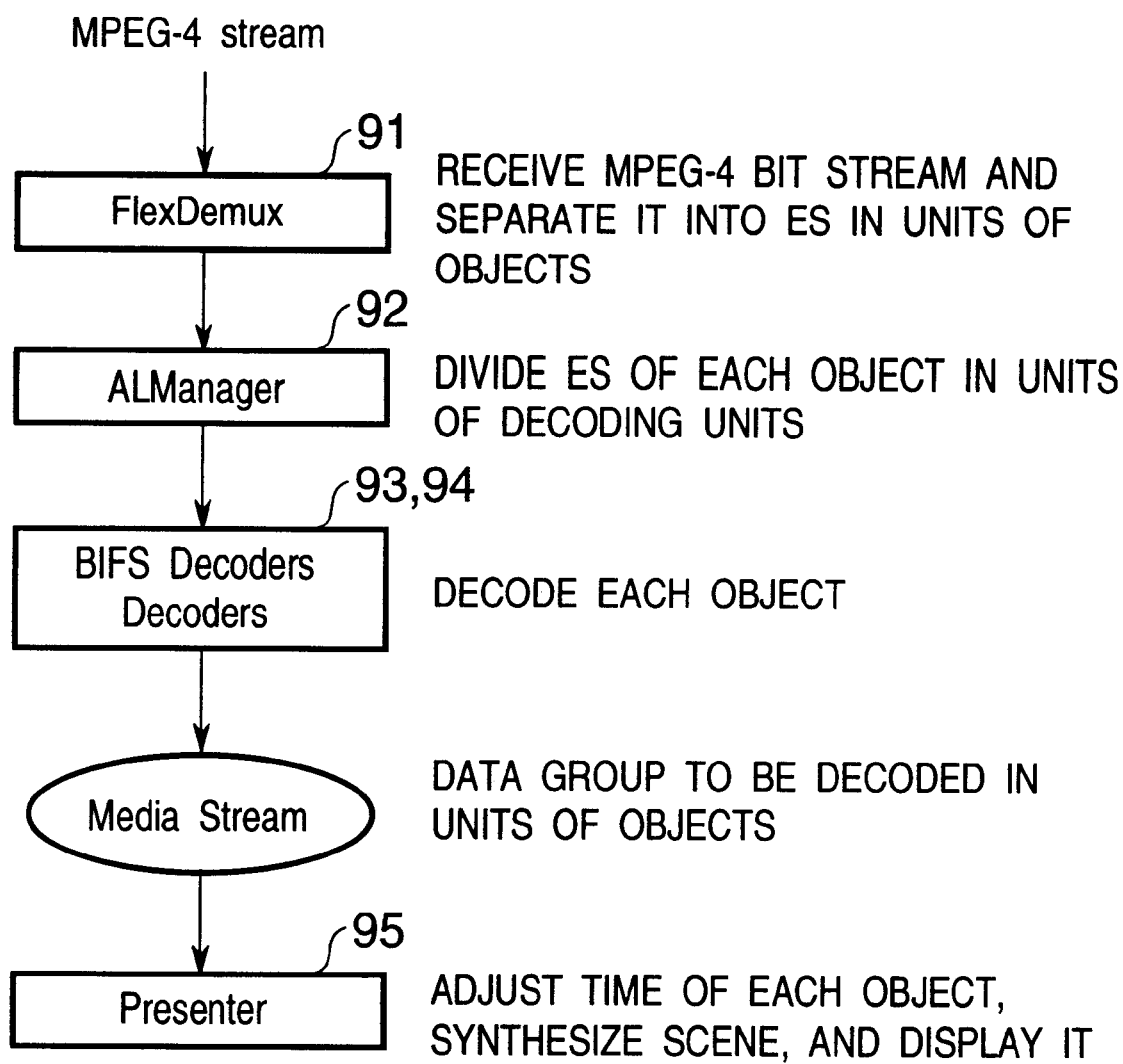
FIG. 10 is a view simply showing a data processing process shown in FIG. 5.

FIG. 10 simply shows the above series of data processing processes.

Referring to FIG. 10, the FlexDemux 91 receives an MPEG-4 bit stream and separates it into elementary streams (ES) in units of object data. The ALManager 92 divides the ES of each object data in units of decoding units. The BIFS Decoder 93 and Decoder 94 decode each object data. A data group Media Stream of the decoded object data is generated. The Presenter 95 executes time adjustment between the individual object data using the "MediaStreamImp::Fetch()" function for processing Media Stream data, synthesizes the object data into one scene, and displays the scene.

Figure 11:
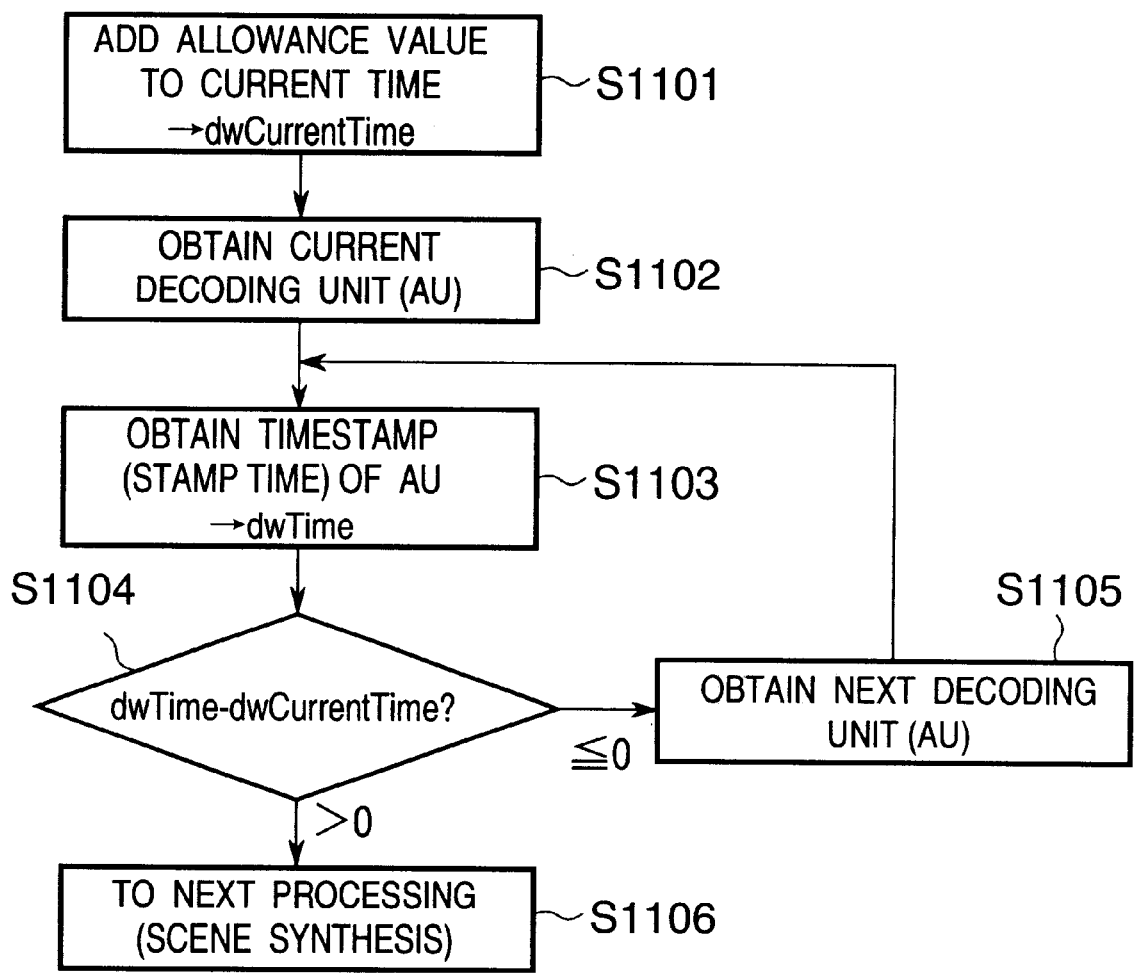
FIG. 11 is a flow chart showing an example of time adjustment operation of an MPEG-4 object access data unit.

FIG. 11 is a flow chart showing a data processing example of time adjustment. Time adjustment processing by the Presenter 95 will be described in detail with reference to FIG. 11.

In step S1101, an allowance value is added to the current time of the System Player (→deCurrentTime). On the basis of this value, the stamp time (TimeStamp) of data to be processed (AU) is converted into the System Player time in step S1102 (→dwTime). In step S1104, the current time (dwCurrentTime) is compared with the stamp time (dwTime) of the data to be processed (AU). When the stamp time (dwTime) of the data to be processed (AU) is later than the current time (dwCurrentTime), the flow advances to step S1106 to synthesize an actual scene. If the stamp time (dwTime) of the data to be processed (AU) is earlier than the current time (dwCurrentTime), it is determined that the data is unsuitable for scene synthesis (it is determined that the data is not in good time for scene synthesis), and the flow advances to step S1105 to process the next data processing block (AU).

Figure 12:
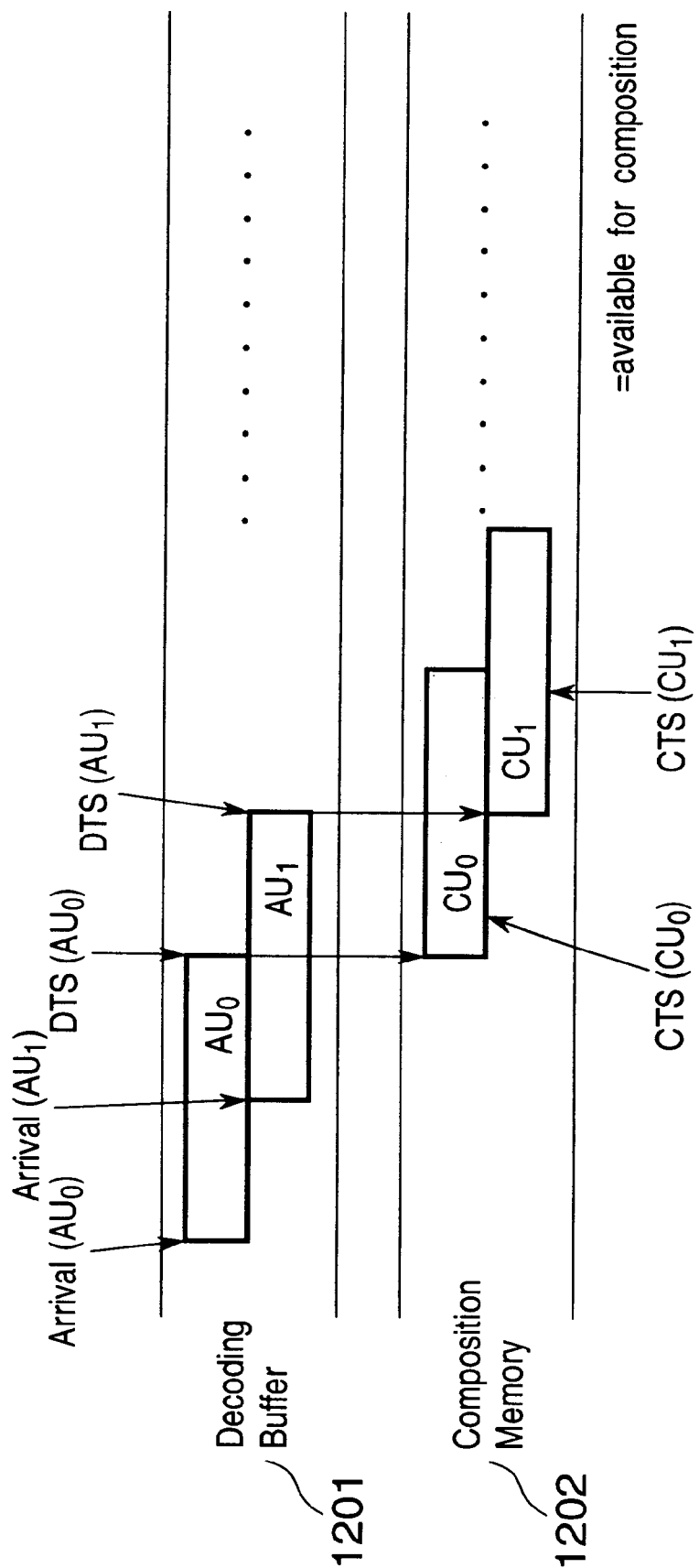
FIG. 12 is a view showing data movement and timing of a Decoding Buffer and Composition Memory.

FIG. 12 is a timing chart showing time adjustment processing shown in FIG. 11 in time series.

Referring to FIG. 12, an Object stream (AU0) arrives at a Decoding Buffer 1201 of the BIFS Decoder 93 or Decoder 94 at time Arrival (AU0), is decoded, and sent to a Composition Memory 1202 of the Presenter 95 at stamp time DTS (AU0) added upon encoding. A scene is synthesized from scene synthesis time CTS (CU0). The next Object stream (AU1) is also transferred from the Decoding Buffer 1201 to the Composition Memory 1202 at time DTS (AU1), and a scene is synthesized from time CTS (CU1).

As is apparent from FIG. 12, in FIG. 11, the time DTS in the Decoding Buffer 1201 is adjusted to the actual scene synthesis time CTS in the Composition Memory 1202, that is later than the actual current time dwCurrentTime.

Figure 13:
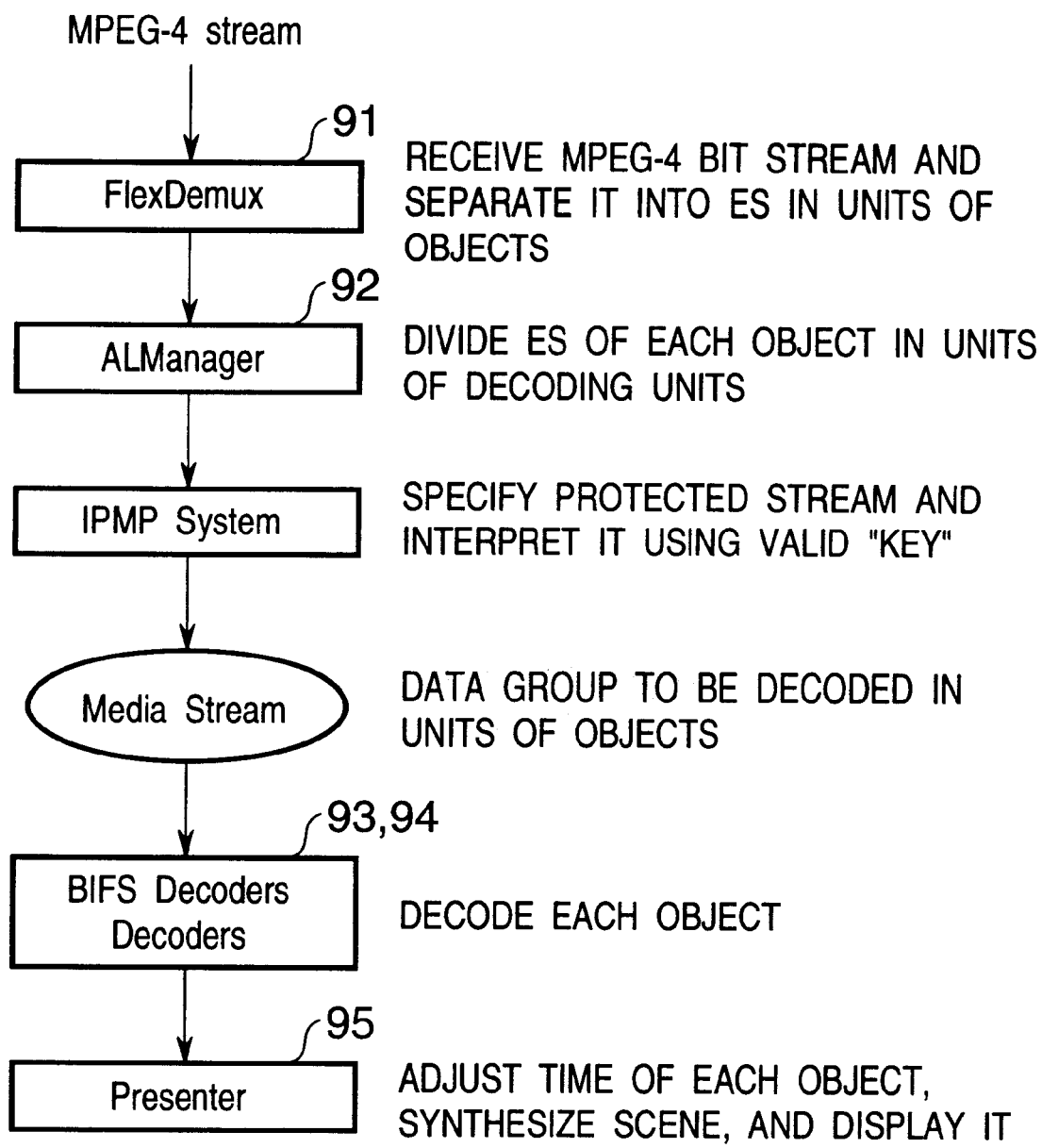
FIG. 13 is a view showing a data processing process in the arrangement shown in FIG. 6, to which an IPMP System processing section is added.

In FIG. 13, processing in the IPMP system is added to the processing flow shown in FIG. 10. More specifically, the following processing is performed.

The process in which the FlexDemux 91 receives an MPEG-4 bit stream and separates it into elementary streams (S) in units of object data, and the ALManger 92 divides the ES of each object data in units of decoding units is the same as in FIG. 10. Next, a protected stream is specified from the object data divided by the ALManager 92, especially on the basis of IPMP-associated information, and IPMP System processing such as normal key input and verification is performed. The BIFS Decoder 93 and Decoder 94 decode the Media Stream as a data group to be decoded in units of object data. The Presenter 95 adjusts time of each object, synthesizes a scene, and displays it.

Object data processing flow control under Test Conditions #1 and #2 in executing test 2 shown in Table 4 will be described below. First, under Test Condition #1, the key interpretation time is transmitted to the decoder as a predetermined delay in units of IPMP Systems. For this reason, when the entire delay is set to be within the range where it can be absorbed by the Compression Layer 84 in FIG. 8 or Presenter 95 in FIG. 9, no problem of synchronization occurs.

Under Text Condition #2, the following processing is performed.

Figure 14:
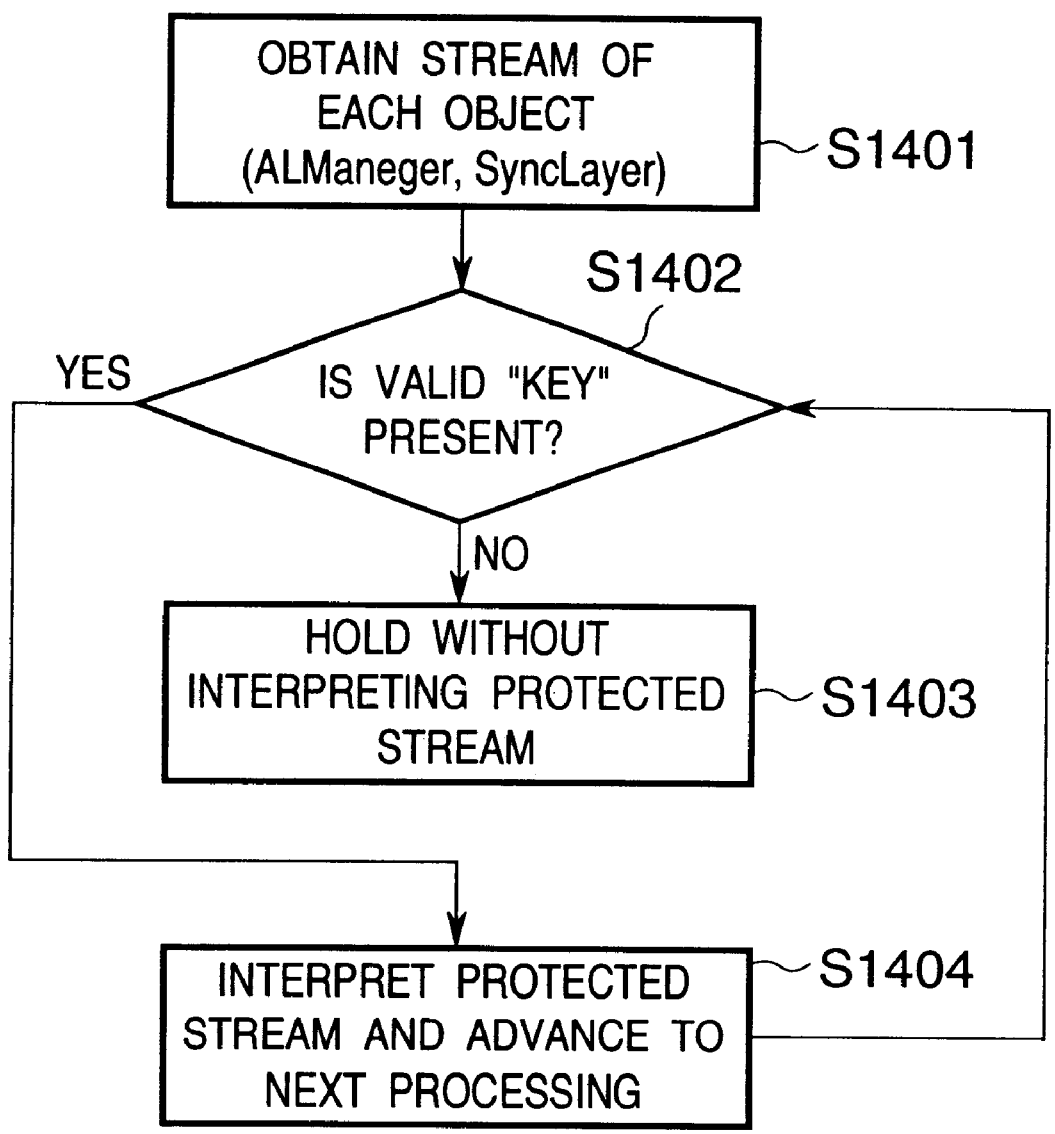
FIG. 14 is a flow chart showing an operation example of the IPMP System shown in FIG. 8.

FIG. 14 is a flow chart for explaining processing of the IPMP system is executing test 2 under Test Condition #2.

In step S1401, the stream of each object divided by the ALManager 92 is obtained. In step S1402, it is determined whether valid key input is present. If NO in step S1402, the flow advances to step S1403 to HOLD processing without interpreting the protected stream. If YES in step S1402, the flow advances to step S1404 to interpret the protected stream. Then, the flow advances to the next processing.

When flow control shown in FIG. 14 is performed in executing test 2 under Text Condition #2, streams until the normal key input are suspended. On the other hand, non-protected stream or streams which have already been verified and interpreted by normal key input are transferred to the subsequent time synchronization processing for decoder processing and scene synthesis. The elapse time until the previous suspended streams are verified and interpreted by normal key input and transferred to the next processing is not constant because of the user interactive operation for each protected stream. In addition, at the processing resumption time, the dwTime may already pass the dwCurrentTime.

In this case, as is apparent from FIGS. 11 and 12, the streams for which processing has been resumed are not decoded until the deTime after resumption becomes later than the dwCurrentTime. Processing skips to the next data to be processed (AU) (i.e., the data is thinned). Skipped portions are not synthesized into a scene.

As described above, under Test Condition #2, the data is partially thinned, so continuous contents cannot be obtained from the first time.

In "push"-type data distribution such as pay TV, one-directional data distribution is basically performed in accordance with the time zone, and data is received by an image reception system with verification function, e.g., a set top box. Since this system can be sufficiently coped with by Test Condition #1, no problem is posed.

However, assume that a viewer sees a commercial demonstration contents groups of the first several minutes of, e.g., a movie and selects one content. If he/she will acquire and enjoy the video data after charging and verification, this case cannot be coped with by Text Condition #1. Under Test Condition #2, since playback is resumed after selection/verification, the viewer cannot obtain some contents, that have already been broadcasted.

The MPEG-4 allows selection/playback in units of video objects. For this reason, in the above commercial demonstration contents, even when verification processing is not performed, some objects such as persons or background can be kept played back as protected streams and graceful error. In this case as well, since playback is resumed after selection/verification under Test Condition #2, the viewer cannot obtain normal and full contents that have already been broadcasted.

When the viewer will enjoy full contents from the beginning, he/she must instruct the server on the contents distribution side to resend the video data from the beginning.

As a general solution, the client (user) side requests the server (contents distribution) side to resent the full contents at the time of resuming video playback after selection/verification. Normally, to issue this request, the server side need provide an application to the client side in advance to receive the request from the client side.

However, when a scene is to be synthesized by obtaining a plurality of video object contents or audio object contents from different URL destination (Uniform Resource Locator), as in the MPEG-4, applications and verification/resending methods for the plurality of contents distribution servers are necessary. This makes program management complex and is not practical.

In the second embodiment, such a signal for instructing to resend video data from the beginning is transmitted to the server as the contents distribution source using the "back-channel" ("back-channel 1" or "back-channel 2" described in the first embodiment, together with URL information of the request destination server and information representing the verification result.

Figure 1:
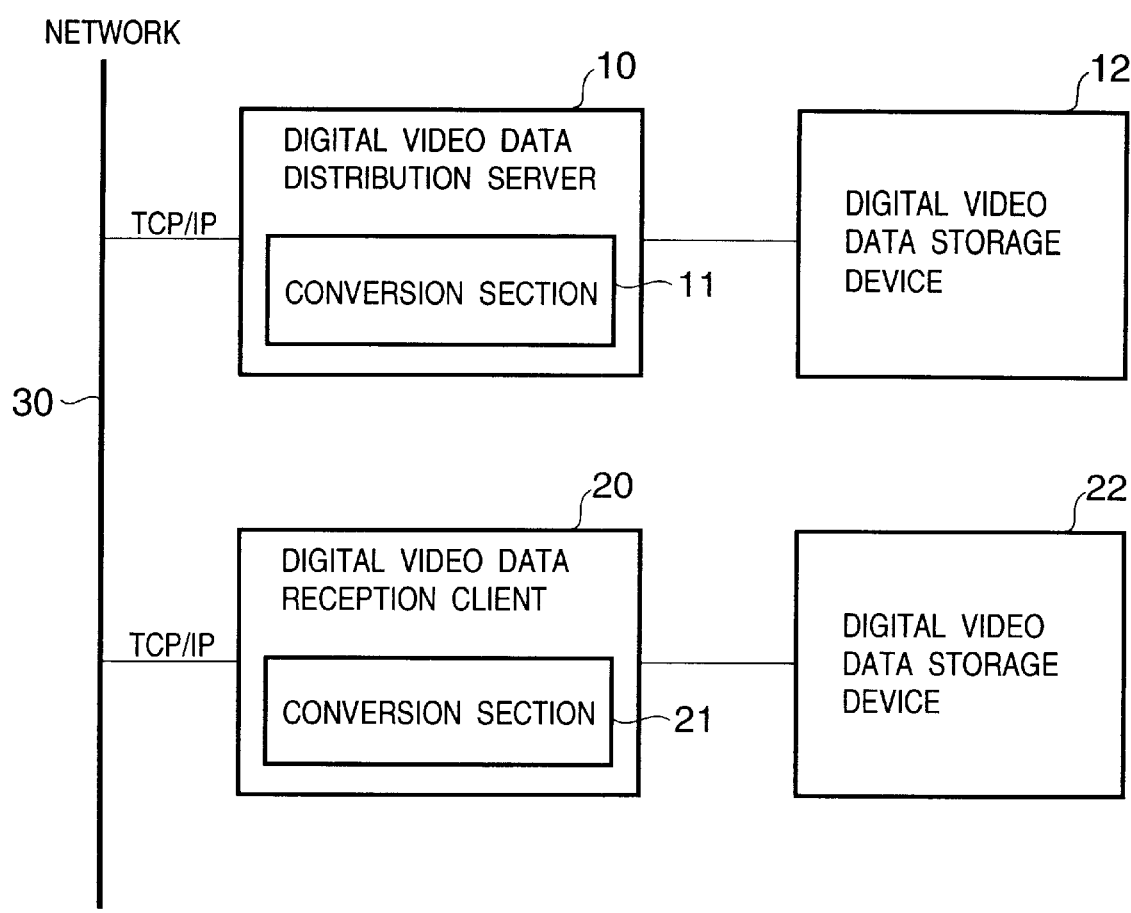
FIG. 1 is a block diagram showing a conventional digital video data transmission/reception system.

More specifically, in the second embodiment, from the player side which receives an MPEG-4 bit stream and plays back a scene (downstream processing) in normal use, information is distributed to the server side using the back-channel function of the MPEG-4 (i.e., verification/resending information is upstream-processed using Upchannel information as shown in FIG. 1). In this method, each contents distribution source server and IPMP System Interface share sections associated with verification/resending information communication, so the cumbersomeness of program management can be decreased.

As described above, according to the second embodiment, since copyright work resending request can be easily transmitted through the network after verification processing, video data to be played back can be prevented from being omitted due to the delay time associated with verification processing.

In the second embodiment, the verification processing method is not particularly specified. More specifically, as in the first embodiment, a verification request signal is sent to each contents distribution server through the network to receive access permission from the contents distribution server. Alternatively, a valid key is stored in the MPEG-4 player in advance, and the viewer locally makes verification.

The present invention may be applied to a system constituted by a plurality of devices or an apparatus comprising a single device.

In addition, an apparatus one method comprising some of all constituent elements of the apparatus or method of the above embodiments also constitutes the invention intended by the present inventor of this application.

The function of the apparatus according to the above embodiments is realized even by permanently or temporarily incorporating a storage medium storing program codes in a system or apparatus and causing the computer (or a CPU or an MPU) of the system or apparatus to read out and execute the program codes stored in the storage medium. In this case, the program codes read out from the storage medium or the storage medium constitutes the invention by itself.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used, though another device may be used.

Not only a case wherein the functions unique to the present invention are realized by executing the program codes read out from the storage medium by the computer but also embodiments in which an OS (Operating System) running on the computer performs part or all of actual processing on the basis of the instructions of the program codes also belongs to the technical range of the present invention.

Embodiments in which after the program codes read out from the storage medium are written in the memory of a function expansion board inserted into the computer or a function expansion unit connected to the computer, the CPU of the function expansion board or function expansion unit performs part of all of actual processing on the basis of the instructions of the program codes also belongs to the technical range of the present invention.

As has been described above, according to the present invention, a plurality of object streams and a stream associated with copyright information are transmitted as one stream, and the stream associated with copyright information is separated and extracted on the reception side. With this arrangement, verification processing can be efficiency executed to effectively protect copyrights and effectively use copyright works.

In addition, according to the present invention, verification processing can be efficiently executed to effectively protect copyrights and effectively use copyright works.

Furthermore, according to the present invention, after verification processing, a copyright resending request is transmitted through the network. With this arrangement, omission of a played back image due to the delay time associated with verification processing can be prevented, and therefore, many verification processing methods become possible.

As many apparently widely different embodiments of the present invention can be made without departing from the spirit and scope thereof, it is to be understood that the invention is not limited to the specific embodiments thereof except as defined in the appended claims.

What is claimed is:

1. An information processing method comprising the steps of:
    a) receiving an information data stream, generated by multiplexing a plurality of coded object data and associated intellectual property management data, from a contents distribution server;
    b) verifying said object data on said received intellectual property management data;
    c) transmitting verification result data and resend request data that requests a resend of said information data stream from the beginning, to said contents distribution server;
    d) receiving an information data stream resent from said contents distribution server; and
    e) reproducing said resent information data stream.

2. The method according to claim 1, wherein said object data is image data.

3. The method according to claim 2, wherein said object data comprises one moving image scene.

4. The method according to claim 3, wherein said object data is bit stream data conforming to an MPEG4 coding scheme.

5. The method according to claim 4, wherein said transmitting step uses an upstream of an MPEG4 bit stream.

6. A computer readable medium on which is stored a computer program that, when executed, enables a computer apparatus to perform an information processing method according to claim 1.

7. A computer program product which, when executed, enables a computer apparatus to perform an information processing method according to claim 1.

8. An information processing method, executed in a contents distribution server, comprising the steps of:
    a) transmitting an information data stream, generated by multiplexing a plurality of coded object data and associated intellectual property management data, to a client;
    b) receiving verification result data and resend request data that requests a resent of said information data stream, from said client; and
    c) transmitting said information data stream from the beginning based on said verification result data and said resent request data, to the client.

9. The method according to claim 8, wherein said object data is image data.

10. The method according to claim 9, wherein said object data comprises one moving image scene.

11. The method according to claim 10, wherein said object data is bit stream data conforming to an MEPG4 coding scheme.

12. A computer readable medium on which is stored a computer program that, when executed, enables a computer apparatus to perform an information processing method according to claim 8.

13. A computer program product which, when executed, enables a computer apparatus to perform an information processing method according to claim 8.

* * * * *

UNITED STATES PATENT AND TRADEMARK OFFICE
CERTIFICATE OF CORRECTION

PATENT NO. : 6,535,919 B1
DATED : March 18, 2003
INVENTOR(S) : Inoue et al.

It is certified that error appears in the above-identified patent and that said Letters Patent is hereby corrected as shown below:

Drawings,
Sheet 5, Fig. 5, "handle for ObjectDescriporStream" should read -- handle for ObjectDescriptorStream --.
Sheet 9, Fig. 9, "T represents a component which users a clock to control its operation." should read -- T represents a component which uses a clock to control its operation. --.
Sheet 14, Fig. 14, block S1401 "(ALManeger," should read -- (ALManager, --.

Column 9,
Line 41, "receive" should read -- receives --.

Column 17,
Line 37, "ent" should read -- ence --.

Column 18,
Line 32, "is expressed" (second occurrence) should be deleted;
Line 34, "hence," should read -- Hence, --; and
Line 42, " "Gradeful" should read -- Graceful --.

Column 21,
Line 4, "is" should read -- in --;
Lines 46 and 55, "broadcasted." should read -- broadcast. --.

Column 22,
Line 50, "constitues" should read -- constitute --.

Column 23,
Line 2, "of" (first occurrence) shoud read -- or --;
Line 3, "belongs" should read -- belong --; and
Line 10, "efficiency" should read -- efficiently --.

UNITED STATES PATENT AND TRADEMARK OFFICE
CERTIFICATE OF CORRECTION

PATENT NO. : 6,535,919 B1
DATED : March 18, 2003
INVENTOR(S) : Inoue et al.

It is certified that error appears in the above-identified patent and that said Letters Patent is hereby corrected as shown below:

<u>Column 24,</u>
Line 24, "resent" should read -- resend --; and
Line 34, "MEPG4" should read -- MPEG4 --.

Signed and Sealed this

Twenty-seventh Day of January, 2004

JON W. DUDAS
*Acting Director of the United States Patent and Trademark Office*